(12) United States Patent
Kiyokawa et al.

(10) Patent No.: US 10,077,045 B2
(45) Date of Patent: Sep. 18, 2018

(54) PARKING ASSIST SYSTEM, METHOD, AND NON-TRANSITORY COMPUTER READABLE MEDIUM STORING PROGRAM

(71) Applicants: AISIN SEIKI KABUSHIKI KAISHA, Kariya-shi, Aichi-ken (JP); DENSO CORPORATION, Kariya-shi, Aichi-ken (JP)

(72) Inventors: Yusuke Kiyokawa, Toyota (JP); Masaya Kato, Toyokawa (JP); Masaki Kinoshita, Kariya (JP); Takayuki Hiromitsu, Kariya (JP)

(73) Assignees: AISIN SEIKI KABUSHIKI KAISHA, Kariya-shi, Aichi-ken (JP); DENSO CORPORATION, Kariya-shi, Aichi-ken (JP)

( * ) Notice: Subject to any disclaimer, the term of this patent is extended or adjusted under 35 U.S.C. 154(b) by 69 days.

(21) Appl. No.: 15/219,641

(22) Filed: Jul. 26, 2016

(65) Prior Publication Data

US 2017/0028984 A1 Feb. 2, 2017

(30) Foreign Application Priority Data

Jul. 31, 2015 (JP) .................................. 2015-152791

(51) Int. Cl.
*B60W 30/06* (2006.01)
*B62D 15/02* (2006.01)
(Continued)

(52) U.S. Cl.
CPC ............ *B60W 30/06* (2013.01); *B60T 7/042* (2013.01); *B60T 7/12* (2013.01); *B62D 15/027* (2013.01);
(Continued)

(58) Field of Classification Search
None
See application file for complete search history.

(56) References Cited

U.S. PATENT DOCUMENTS

2009/0123028 A1 5/2009 Satonaka
2011/0087406 A1 4/2011 Barth et al.
(Continued)

FOREIGN PATENT DOCUMENTS

DE 102013103569 A1 10/2013
JP 2012-073836 A 4/2012
JP 2014-043140 A 3/2014

OTHER PUBLICATIONS

Communication dated Dec. 20, 2016, from the European Patent Office in counterpart European Application No. 16181156.7.

*Primary Examiner* — Mussa A Shaawat
*Assistant Examiner* — Michael V Kerrigan
(74) *Attorney, Agent, or Firm* — Sughrue Mion, PLLC

(57) ABSTRACT

A parking assist system includes an electronic control unit configured to: estimate first extending directions of obstacles respectively located on right and left sides of a target parking space in a state where a host vehicle moves across in front of the target parking space; calculate a planned moving path based on the estimated first extending directions; as the host vehicle is guided into the target parking space, estimate second extending directions of the obstacles respectively located on the right and left sides of the target parking space while updating the second extending directions; determine whether the estimated and updated second extending directions satisfy a predetermined condition; and when the updated second extending directions satisfy the predetermined condition, update the planned moving path by using the updated second extending directions instead of the first extending directions or the second extending directions before being updated.

6 Claims, 16 Drawing Sheets

(51) Int. Cl.
*B60T 7/04* (2006.01)
*B60T 7/12* (2006.01)
*G05D 1/02* (2006.01)
*G01S 15/93* (2006.01)
*G01S 15/87* (2006.01)

(52) U.S. Cl.
CPC ........ *B62D 15/0285* (2013.01); *G01S 15/931* (2013.01); *G05D 1/0212* (2013.01); *B60T 2201/03* (2013.01); *G01S 15/87* (2013.01); *G01S 2015/933* (2013.01); *G01S 2015/935* (2013.01); *G01S 2015/936* (2013.01); *G01S 2015/938* (2013.01)

(56) References Cited

U.S. PATENT DOCUMENTS

| | | | |
|---|---|---|---|
| 2015/0134185 A1* | 5/2015 | Lee | B62D 15/0285 701/26 |
| 2016/0280263 A1* | 9/2016 | Mori | B62D 15/027 |

* cited by examiner

PARKING ASSIST SYSTEM, METHOD, AND NON-TRANSITORY COMPUTER READABLE MEDIUM STORING PROGRAM

INCORPORATION BY REFERENCE

The disclosure of Japanese Patent Application No. 2015-152791 filed on Jul. 31, 2015 including the specification, drawings and abstract is incorporated herein by reference in its entirety.

BACKGROUND OF THE INVENTION

1. Field of the Invention

The invention relates to a parking assist system, a method, and a non-transitory computer readable medium storing a program.

2. Description of Related Art

As a technique for assisting in parking a vehicle, there is suggested a technique for providing a driver with image data captured as a surrounding environment around the vehicle by a plurality of cameras installed in the vehicle. Further, there is suggested a technique for assisting in, for example, parking a vehicle by displaying a predicted moving trajectory in the case where the vehicle moves in the future at a steering angle of the vehicle.

When a vehicle is reversed into a parking space in a perpendicular manner (i.e., when a vehicle is reversed to be parked in a position perpendicular to a road, a curb, or the like) in a parking area or the like, that is, reverse perpendicular parking is performed, it is required to estimate the positions of obstacles, which will be located on the right and left sides of the host vehicle with the use of, for example, ultrasonic sensors (so-called sonars) at the time of detecting an intended parking area.

Another vehicle as an obstacle can be treated on the assumption that the side face of the vehicle is flat. Therefore, when other vehicles are respectively located on the right and left sides after parking, it is easier to detect an intended parking area. However, when there is a wall having at least a projection, an H-shaped steel member arranged in a brace manner instead of a wall, or the like, it is difficult to estimate the position of an obstacle (in the case of an ultrasonic sensor, it is difficult to estimate the position of a reflection surface at which ultrasonic wave is reflected). As a result, parking accuracy in parking assist decreases, and accordingly, the driver parks the vehicle again or the number of times a maneuvering process (a process of maneuvering (turning) a steering wheel for changing a traveling direction of the vehicle between a forward direction and a reverse direction) is executed increases during the parking assist control. Therefore, a time is consumed for parking, and the parking assist is not usable for the driver who is a user. Improved parking accuracy and further quick completion of parking are desired for parking assist.

SUMMARY OF THE INVENTION

A first aspect of the invention relates to a parking assist system that performs parking assist when a host vehicle is reversed to be parked in a perpendicular manner in a target parking space. The parking assist system includes an electronic control unit configured to: when the host vehicle is reversed to be parked in the perpendicular manner in the target parking space, estimate first extending directions that are extending directions of obstacles respectively located on right and left sides of the target parking space in a state where the host vehicle moves across in front of the target parking space; calculate a planned moving path along which the host vehicle is reversed to be parked in the perpendicular manner in the target parking space, based on the estimated first extending directions of the obstacles respectively located on the right and left sides of the target parking space; as the host vehicle is guided into the target parking space while the host vehicle is reversed, estimate second extending directions that are extending directions of the obstacles respectively located on the right and left sides of the target parking space while updating the second extending directions until the host vehicle reaches a parking target position; determine whether the estimated and updated second extending directions of the obstacles respectively located on the right and left sides of the target parking space satisfy a predetermined condition; and when the updated second extending directions satisfy the predetermined condition based on a determination result, update the planned moving path by using the updated second extending directions instead of the first extending directions or the second extending directions before being updated. With the above configuration, when the second extending directions satisfy the predetermined condition in the case where parking assist is performed, the planned moving path is updated by using the updated second extending directions instead of the first extending directions or the second extending directions before being updated. Therefore, it is possible to more accurately perform parking assist as the host vehicle approaches the parking target position.

In the first aspect, the electronic control unit may be configured to: determine whether the host vehicle has reached the parking target position based on a predetermined criterion; and when at least one of the updated second extending directions satisfies the predetermined condition, determine whether the host vehicle has reached the parking target position by using a reach determination condition that is looser than a reach determination condition used in a case where neither of the updated second extending directions satisfies the predetermined condition.

With the above configuration, when at least one of the second extending directions satisfies the predetermined condition, and thus, it is considered that reliability is high, it is possible to more reliably and quickly end parking assist.

In the first aspect, the electronic control unit may be configured to, when the electronic control unit determines that the host vehicle has reached the parking target position, cause the host vehicle to move to the parking target position by executing a maneuvering process for changing a traveling direction of the host vehicle between a forward direction and a reverse direction, a predetermined number of times. With the above configuration, parking accuracy is further improved. In addition, since the number of times the maneuvering process is executed is set to the predetermined number of times, it is possible to reliably and quickly complete parking assist.

In the first aspect, the electronic control unit may be configured to, when only one of the estimated and updated second extending directions of the obstacles respectively located on the right and left sides of the target parking space satisfies the predetermined condition, update the planned moving path by using only the one second extending direction that satisfies the predetermined condition. With the above configuration, route guidance is performed with the use of only the second extending direction that satisfies the predetermined condition and of which reliability is high. Therefore, parking assist is reliably performed.

In the first aspect, the electronic control unit may be configured to, when both of the two estimated and updated second extending directions of the obstacles respectively located on the right and left sides of the target parking space satisfy the predetermined condition, update the planned moving path by using an average of the two second extending directions. With the above configuration, parking assist is performed with the set path having higher reliability.

A second aspect of the invention relates to a method that is performed in a parking assist system that performs parking assist when a host vehicle is reversed to be parked in a perpendicular manner in a target parking space. The method includes a first step of, when the host vehicle is reversed to be parked in the perpendicular manner in the target parking space, estimating first extending directions that are extending directions of obstacles respectively located on right and left sides of the target parking space in a state where the host vehicle moves across in front of the target parking space; a second step of calculating a planned moving path along which the host vehicle is reversed to be parked in the perpendicular manner in the target parking space, based on the estimated first extending directions of the obstacles respectively located on the right and left sides of the target parking space; a third step of, as the host vehicle is guided into the target parking space while the host vehicle is reversed, estimating second extending directions that are extending directions of the obstacles respectively located on the right and left sides of the target parking space while updating the second extending directions until the host vehicle reaches a parking target position; a fourth step of determining whether the estimated and updated second extending directions of the obstacles respectively located on the right and left sides of the target parking space satisfy a predetermined condition; and a fifth step of, when the updated second extending directions satisfy the predetermined condition based on a determination result obtained in the fourth step, updating the planned moving path by using the updated second extending directions instead of the first extending directions or the second extending directions before being updated.

With the above configuration, when the second extending directions satisfy the predetermined condition in the case where parking assist is performed, the planned moving path is updated by using the updated second extending directions instead of the first extending directions or the second extending directions before being updated. Therefore, it is possible to more accurately perform parking assist as the host vehicle approaches the parking target position.

A third aspect of the invention relates to a non-transitory computer readable medium storing a program for causing a computer to control a parking assist system that performs parking assist when a host vehicle is reversed to be parked in a perpendicular manner in a target parking space. The program causes the computer to function as: a first estimation unit that, when the host vehicle is reversed to be parked in the perpendicular manner in the target parking space, estimates first extending directions that are extending directions of obstacles respectively located on right and left sides of the target parking space in a state where the host vehicle moves across in front of the target parking space; a moving path calculation unit that calculates a planned moving path along which the host vehicle is reversed to be parked in the perpendicular manner in the target parking space, based on the estimated first extending directions of the obstacles respectively located on the right and left sides of the target parking space; a second estimation unit that, as the host vehicle is guided into the target parking space while the host vehicle is reversed, estimates second extending directions that are extending directions of the obstacles respectively located on the right and left sides of the target parking space while updating the second extending directions until the host vehicle reaches a parking target position; a determination unit that determines whether the estimated and updated second extending directions of the obstacles respectively located on the right and left sides of the target parking space satisfy a predetermined condition; and a moving path updating unit that, when the updated second extending directions satisfy the predetermined condition based on a determination result, updates the planned moving path by using the updated second extending directions instead of the first extending directions or the second extending directions before being updated.

With the above configuration, when the second extending directions satisfy the predetermined condition in the case where parking assist is performed, the planned moving path is updated by using the updated second extending directions instead of the first extending directions or the second extending directions before being updated. Therefore, it is possible to further accurately perform parking assist as the host vehicle approaches the parking target position.

BRIEF DESCRIPTION OF THE DRAWINGS

Features, advantages, and technical and industrial significance of example embodiments of the invention will be described below with reference to the accompanying drawings, in which like numerals denote like elements, and wherein:

FIG. 1 is an example perspective view of a vehicle according to an embodiment of the invention in a state where part of a cabin is seen through;

DETAILED DESCRIPTION OF EMBODIMENTS

Hereinafter, an example embodiment of the invention will be described. The configuration of the embodiment described below, and the operation, results and advantageous effects obtained from the configuration are examples. The invention may be implemented by a configuration other than the configuration that will be described in the following embodiment, and it is possible to obtain various advantageous effects based on a basic configuration and at least one of secondary advantageous effects.

A vehicle 1 according to the present embodiment may be, for example, a vehicle (e.g., an automobile) that uses an internal combustion engine (not shown) as a drive source, that is, an internal combustion engine vehicle, may be a vehicle (e.g., an automobile) that uses an electric motor (not shown) as a drive source, that is, an electric vehicle, a fuel-cell vehicle, or the like, may be a hybrid vehicle (e.g., a hybrid automobile) that uses both the internal combustion engine and the electric motor as drive sources, or may be a vehicle (e.g., an automobile) including another drive source. Various transmissions may be mounted on the vehicle 1. Various devices, such as system and components, required to drive an internal combustion engine or an electric motor may be mounted on the vehicle 1. The system, number, layout, and the like, of each device related to driving of wheels 3 in the vehicle 1 may be variously set.

Figure 1:
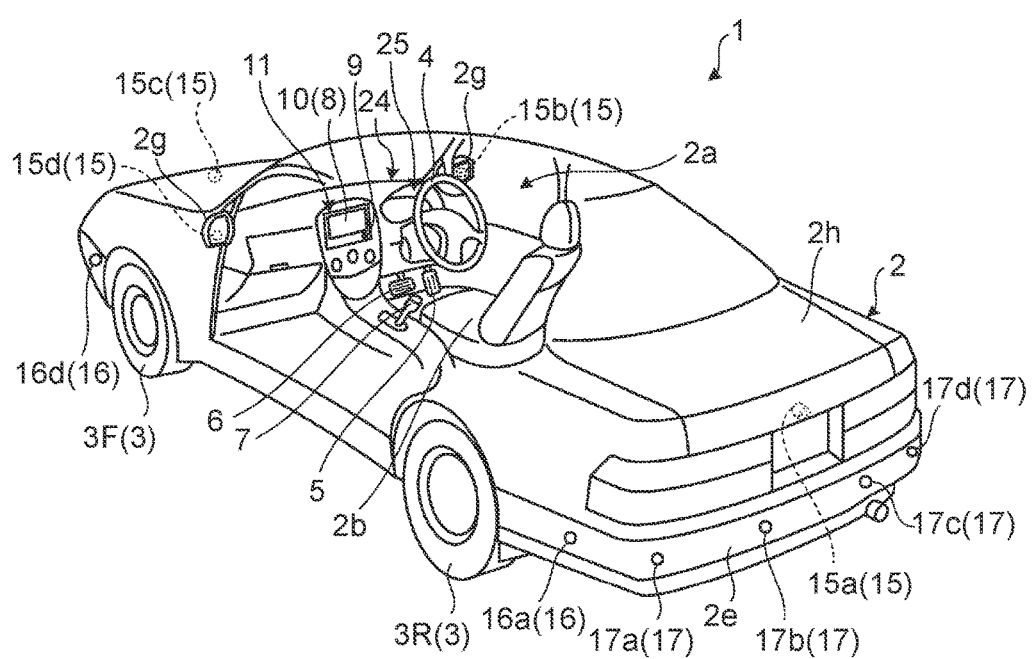
Figure 2:
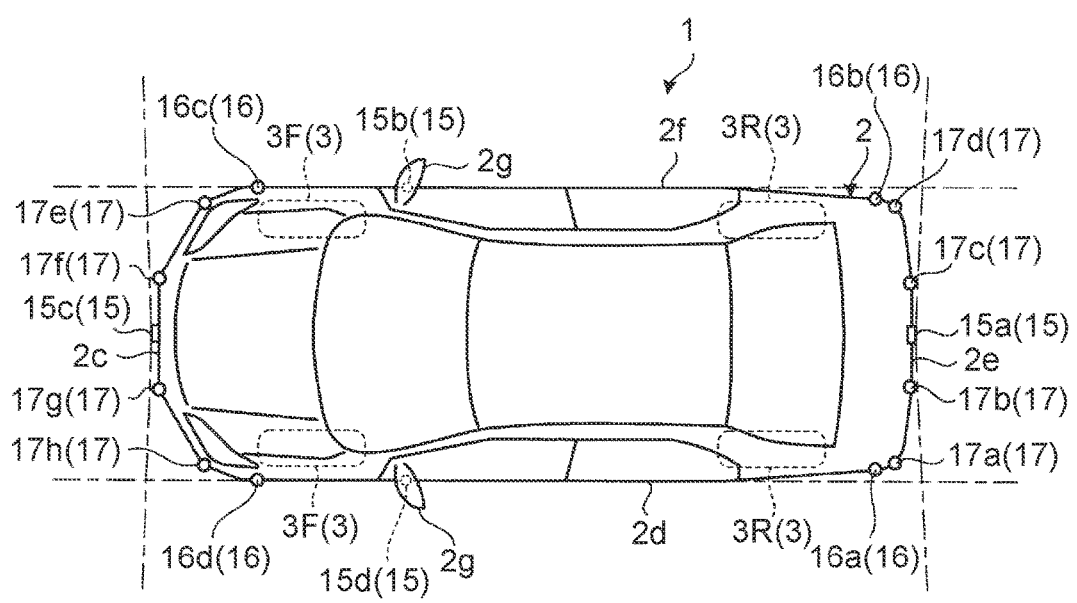
FIG. 2 is an example plan view (bird's-eye view) of the vehicle according to the embodiment.

FIG. 1 is an example perspective view of the vehicle according to the embodiment in a state where part of a cabin of a vehicle is seen through. FIG. 2 is an example plan view (bird's-eye view) of the vehicle according to the embodiment. As illustrated in FIG. 1, a vehicle body 2 constitutes a cabin 2a in which an occupant (not shown) is seated. A steering unit 4, an accelerator operation unit 5, a brake operation unit 6, a shift operation unit 7, and the like, are provided near (i.e., provided to face) a seat 2b of a driver as an occupant inside the cabin 2a. The steering unit 4 is, for example, a steering wheel projecting from a dashboard 24. The accelerator operation unit 5 is, for example, an accelerator pedal located near driver's foot. The brake operation unit 6 is, for example, a brake pedal located near driver's foot. The shift operation unit 7 is, for example, a shift lever projecting from a center console. The steering unit 4, the accelerator operation unit 5, the brake operation unit 6, the shift operation unit 7, and the like, are not limited to these components.

A display device 8 and an audio output device 9 are provided inside the cabin 2a. The display device 8 serves as a display output unit. The audio output device 9 serves as an audio output unit. The display device 8 is, for example, a liquid crystal display (LCD), an organic electroluminescent display (OELD), or the like. The audio output device 9 is, for example, a speaker. The display device 8 is, for example, covered with a translucent operation input unit 10 such as a touch panel. An occupant is allowed to visually recognize an image that is displayed on the display screen of the display device 8 via the operation input unit 10. An occupant is allowed to perform an input operation by operating the operation input unit 10 through touching, pressing or moving the operation input unit 10 with a finger, or the like, at a position corresponding to an image that is displayed on the display screen of the display device 8. These display device 8, audio output device 9, operation input unit 10, and the like, are, for example, provided in a monitor device 11 located at the center in the vehicle width direction, that is, lateral direction, of the dashboard 24. The monitor device 11 may have an operation input unit (not shown), such as a switch, a dial, a joystick or a push button. An audio output device (not shown) may be provided at a position inside the cabin 2a, the position being different from the position of the monitor device 11. Audio may be output from the audio output device 9 of the monitor device 11 and another audio output device. The monitor device 11 is, for example, shared with a navigation system or an audio system. A display device 12 (see FIG. 3) other than the display device 8 is provided inside the cabin 2a.

Figure 3:
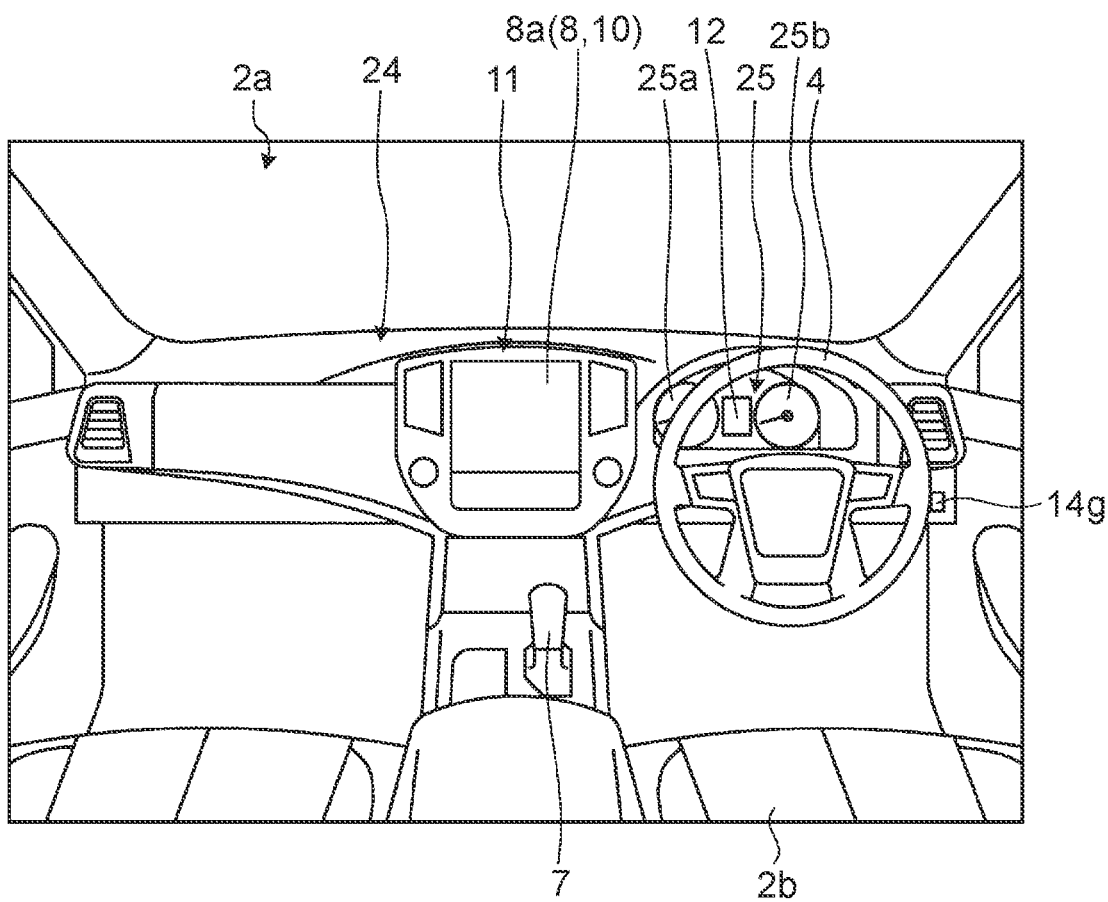
FIG. 3 is a view of an example of a dashboard of the vehicle according to the embodiment when viewed from the rear side of the vehicle.

FIG. 3 is a view of an example of the dashboard of the vehicle according to the embodiment when viewed from the rear side of the vehicle. As shown in FIG. 3, the display device 12 is, for example, provided in an instrument panel unit 25 in the dashboard 24, and is located at substantially the center of the instrument panel unit 25, that is, between a speed indicating unit 25a and a rotation speed indicating unit 25b. The size of the screen of the display device 12 is smaller than the size of the screen (FIG. 1) of the display device 8. An image that shows information for assisting in parking the vehicle 1 is mainly displayed on the display device 12. The amount of information that is displayed on the display device 12 may be smaller than the amount of information that is displayed on the display device 8. The display device 12 is, for example, an LCD, an OELD, or the like. Information that is displayed on the display device 12 may be displayed on the display device 8.

As illustrated in FIG. 1 and FIG. 2, the vehicle 1 is, for example a four-wheel vehicle, and includes two right and left front wheels 3F and two right and left rear wheels 3R. Each of these four wheels 3 may be configured to be steerable.

Figure 4:
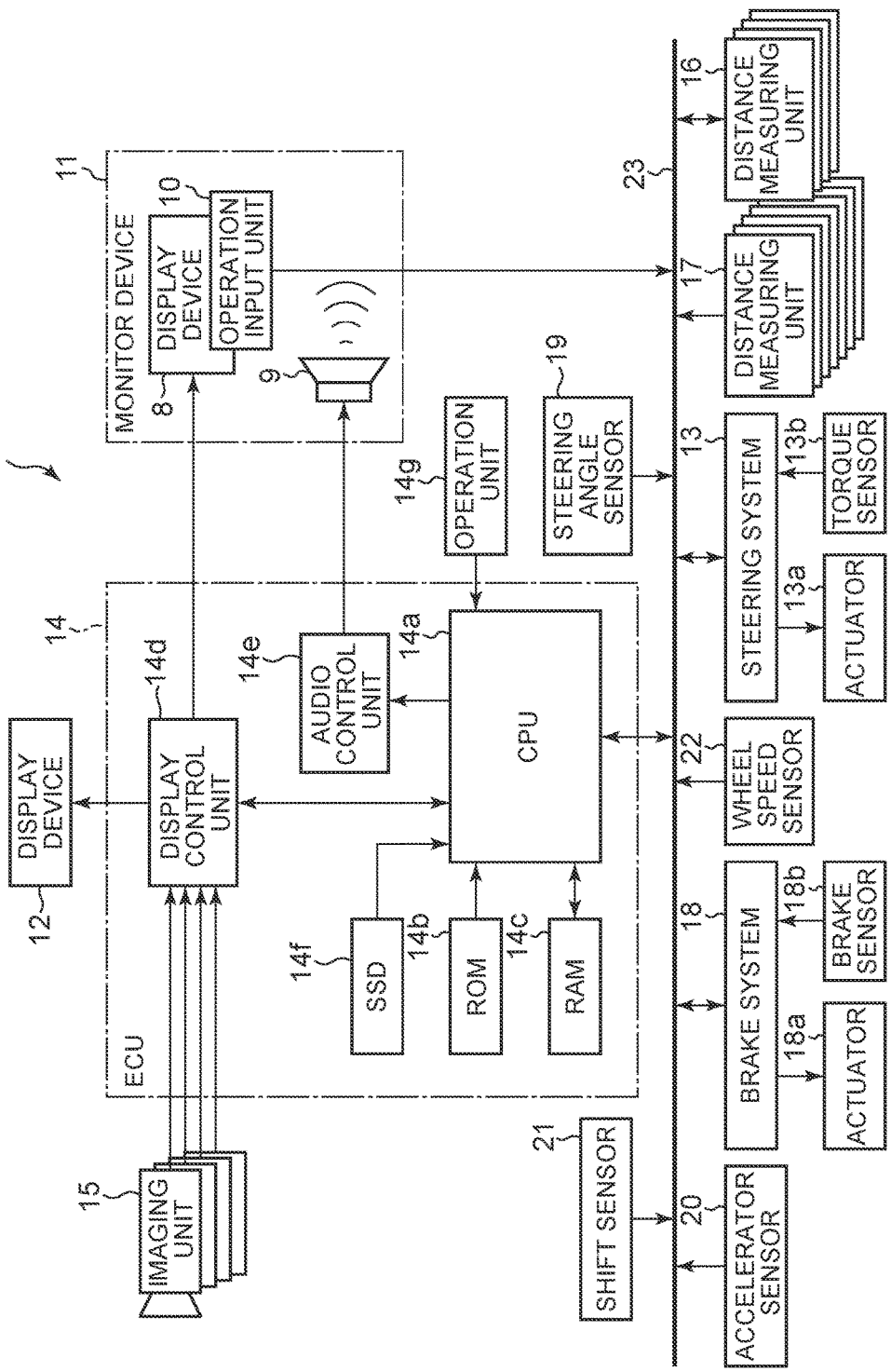
FIG. 4 is an example block diagram of the configuration of a parking assist system according to the embodiment.

FIG. 4 is an example block diagram of the configuration of a parking assist system according to the embodiment. As illustrated in FIG. 4, the vehicle 1 includes a steering system that steers at least two of the wheels 3. The steering system 13 includes an actuator 13a and a torque sensor 13b. The steering system 13 is electrically controlled by an electronic control unit (ECU) 14, or the like, to actuate the actuator 13a. The steering system 13 is, for example, an electric power steering system, a steer-by-wire (SBW) system, or the like. The steering system 13 adds torque, that is, assist torque, to the steering unit 4 with the use of the actuator 13a to assist steering force or steers the wheels 3 with the use of the actuator 13a. In this case, the actuator 13a may steer one of the wheels 3 or may steer a plurality of the wheels 3. The torque sensor 13b, for example, detects a torque that is applied to the steering unit 4 by a driver.

As illustrated in FIG. 2, for example, four imaging units 15a to 15d are provided on the vehicle body 2 as a plurality of imaging units 15. Each of the imaging units 15 is, for example, a digital camera that includes an imaging device, such as a charge coupled device (CCD) or a CMOS image sensor (CIS). Each of the imaging units 15 is able to output moving image data at a predetermined frame rate. Each of the imaging units 15 has a wide angle lens or a fisheye lens, and is able to capture an image in, for example, the range of 140° to the range of 190° in the horizontal direction. The optical axis of each of the imaging units 15 is set so as to be oriented obliquely downward. Thus, each of the imaging units 15 sequentially captures a road surface on which the vehicle 1 is allowed to move and an outside environment around the vehicle body 2, including an area in which the vehicle 1 is allowed to be parked, and outputs the captured image as captured image data.

The imaging unit 15a is, for example, located at a rear end 2e of the vehicle body 2, and is provided at a lower wall portion of a door 2h of a rear trunk (boot). The imaging unit 15b is, for example, located at a right-side end 2f of the vehicle body 2, and is provided at a right-side door mirror 2g. The imaging unit 15c is, for example, located at the front of the vehicle body 2, that is, a front end 2c in the vehicle front-rear direction (vehicle longitudinal direction), and is provided at a front bumper, or the like. The imaging unit 15d is, for example, located at the left side of the vehicle body 2, that is, a left-side end 2d in the vehicle width direction, and is provided at a door mirror 2g that serves as a left-side projecting portion. The ECU 14 is able to generate an image having a wider viewing angle or generate an imaginary bird's-eye image of the vehicle 1 seen from above by executing operation processing (computing processing) and image processing on the basis of the image data obtained by the imaging units 15. A bird's-eye image may be referred to as plan image.

The ECU 14 identifies partition lines, or the like, on a road surface around the vehicle 1 from the images of the imaging units 15, and detects (extracts) parking spaces indicated by the partition lines, or the like.

As illustrated in FIG. 1 and FIG. 2, for example, four distance measuring units 16a to 16d and eight distance measuring units 17a to 17h are provided on the vehicle body 2 as a plurality of distance measuring units 16, 17. Each of the distance measuring units 16, 17 is, for example, a sonar that emits an ultrasonic wave and captures the reflected wave. The sonar may also be referred to as a sonar sensor or an ultrasonic detector. The ECU 14 is able to detect whether there is an object, such as an obstacle, located around the vehicle 1 or measure a distance to the object on the basis of the results of detection performed by the distance measuring units 16, 17. That is, each of the distance measuring units 16, 17 is an example of a detection unit that detects an object. Each of the distance measuring units 17 may be, for example, used to detect an object at a relatively short distance. Each of the distance measuring units 16 may be, for example, used to detect an object at a relatively long distance, that is, an object located far from the vehicle 1, as compared to an object detected by each of the distance measuring units 17. The distance measuring units 17 may be, for example, used to detect an object ahead of or behind the vehicle 1. The distance measuring units 16 may be, for example, used to detect an object on the side of the vehicle 1.

As illustrated in FIG. 4, in a parking assist system 100, in addition to the ECU 14, the monitor device 11, the steering system 13, the distance measuring units 16, 17, and the like, a brake system 18, a steering angle sensor 19, an accelerator sensor 20, a shift sensor 21, a wheel speed sensor 22, and the like, are electrically connected to one another via an in-vehicle network 23 that serves as an electric communication line. The in-vehicle network 23 is, for example, provided as a controller area network (CAN). The ECU 14 is able to control the steering system 13, the brake system 18, and the like, by transmitting control signals through the in-vehicle network 23. The ECU 14 is able to receive results of detection performed by the torque sensor 13b, a brake sensor 18b, the steering angle sensor 19, the distance measuring units 16, the distance measuring units 17, the accelerator sensor 20, the shift sensor 21, the wheel speed sensor 22, and the like, and operation signals of the operation input unit 10, and the like, via the in-vehicle network 23.

The ECU 14, for example, includes a central processing unit (CPU) 14a, a read only memory (ROM) 14b, a random access memory (RAM) 14c, a display control unit 14d, an audio control unit 14e, a solid state drive or flash memory (SSD) 14f, and the like. The CPU 14a is, for example, able to execute various operation processing (computing processing) and controls, such as image processing related to images that are displayed on the display devices 8, 12, determination of a moving target position for the vehicle 1, computation of a moving path for the vehicle 1, determination as to whether there is an interference with an object, automatic control over the vehicle 1, and cancellation of automatic control. The CPU 14a is able to read a program installed and stored in a nonvolatile storage device, such as the ROM 14b, and execute operation processing in accordance with the program. The RAM 14c temporarily stores various pieces of data that are used for computation in the CPU 14a. The display control unit 14d mainly executes image processing with the use of image data obtained by the imaging units 15, synthesis of image data that are displayed on the display devices 8, 12, and the like, within the various operation processing executed in the ECU 14. The audio control unit 14e mainly execute processing on audio data that are output from the audio output device 9, within the various operation processing executed in the ECU 14. The SSD 14f is a rewritable nonvolatile storage unit, and is able to store data even when the power of the ECU 14 is turned off. The CPU 14a, the ROM 14b, the RAM 14c, and the like, may be integrated within the same package. The ECU 14 may be formed of another logical operation processor, such as a digital signal processor (DSP), a logical circuit, or the like, instead of the CPU 14a. A hard disk drive (HDD) may be provided instead of the SSD 14f. The SSD 14f or the HDD may be provided separately from the ECU 14.

The brake system 18 is, for example, an anti-lock brake system (ABS) that prevents the brake from locking up the wheels, a side slip prevention device (electronic stability control (ESC)) that prevents a side slip of the vehicle 1 during cornering, an electric brake system that enhances brake force (performs brake assist), a brake-by-wire (BBW), or the like. The brake system 18 imparts braking force to the wheels 3, and accordingly, imparts braking force to the vehicle 1, via the actuator 18a. The brake system 18 is able to execute various controls by detecting locking up of the wheels by the brake, a spin of the wheels 3, a sign of a side slip, and the like, from, for example, a rotation difference between the right and left wheels 3. The brake sensor 18b is, for example, a sensor that detects the position of a movable unit of the brake operation unit 6. The brake sensor 18b is able to detect the position of the brake pedal that serves as the movable unit of the brake operation unit 6. The brake sensor 18b includes a displacement sensor.

The steering angle sensor 19 is, for example, a sensor that detects a steering amount of the steering unit 4, such as the steering wheel. The steering angle sensor 19 is, for example, configured by using a Hall element, or the like. The ECU 14 acquires the steering amount of the steering unit 4 operated by a driver, a steering amount of each wheel 3 during automatic steering, or the like, from the steering angle sensor 19, and executes various controls. The steering angle sensor 19 detects a rotation angle of a rotating portion included in the steering unit 4. The steering angle sensor 19 is an example of an angle sensor.

The accelerator sensor 20 is, for example, a sensor that detects the position of a movable unit of the accelerator operation unit 5. The accelerator sensor 20 is able to detect the position of the accelerator pedal that serves as the movable unit of the accelerator operation unit 5. The accelerator sensor 20 includes a displacement sensor.

The shift sensor 21 is, for example, a sensor that detects the position of a movable unit of the shift operation unit 7. The shift sensor 21 is able to detect the position of a lever, arm, button, or the like, that serves as the movable unit of the shift operation unit 7. The shift sensor 21 may include a displacement sensor or may be provided as a switch.

The wheel speed sensor 22 is a sensor that detects a rotation amount or the number of rotations of each wheel 3 per unit time. The wheel speed sensor 22 outputs a wheel speed pulse number indicating the detected number of rotations (i.e., the detected rotation speed), as a sensor value. The wheel speed sensor 22 may be, for example, configured by using a Hall element, or the like. The ECU 14 computes a moving amount, and the like, of the vehicle 1 on the basis of the sensor value acquired from the wheel speed sensor 22, and executes various controls. There is a case where the wheel speed sensor 22 is provided in the brake system 18. In this case, the ECU 14 acquires the result of detection performed by the wheel speed sensor 22, via the brake system 18.

The configurations, arrangement, electrical connection modes, and the like, of the above-described various sensors and actuators are examples, and may be variously set (changed).

Figure 5:
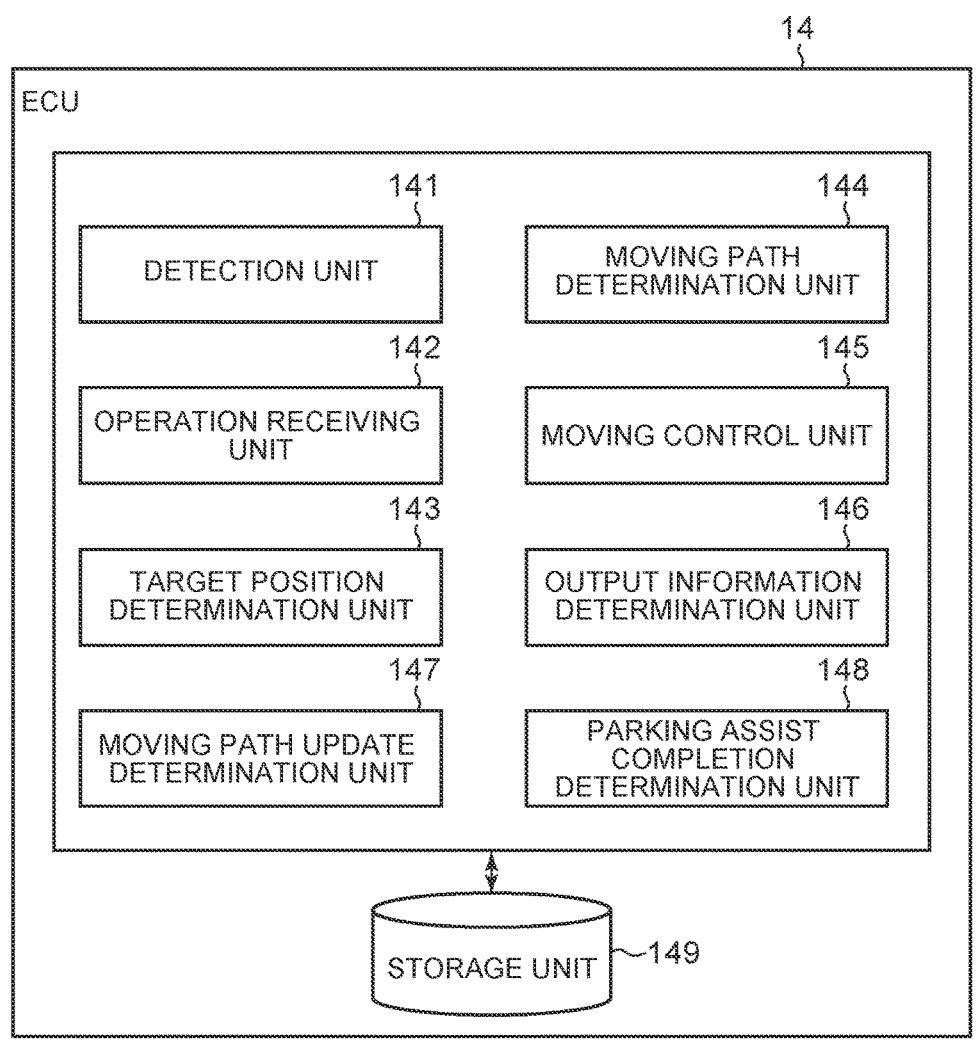
FIG. 5 is an example block diagram of the configuration of an ECU of the parking assist system according to the embodiment.

In the present embodiment, the ECU 14 implements at least part of the function of a parking assist system by cooperation between hardware and software (control program). FIG. 5 is a block diagram illustrating a functional configuration of the ECU. As shown in FIG. 5, the ECU 14 functions as a detection unit 141, an operation receiving unit 142, a target position determination unit 143, a moving path determination unit 144, a moving control unit 145, an output information determination unit 146, a moving path update determination unit 147, a parking assist completion determination unit 148, and a storage unit 149.

In the above configuration, the detection unit 141 detects the position of the vehicle 1 that is a host vehicle, an obstacle, such as another vehicle and a pole, a frame line, such as a parking space line, and the like. The operation receiving unit 142 acquires an operation signal that is input through operation of an operation unit 14g. The operation unit 14g is, for example, formed of a push button, a switch, or the like, and outputs an operation signal.

The target position determination unit 143 determines a moving target position (parking target position) for the vehicle 1. The moving path determination unit 144 determines a moving path to the moving target position for the vehicle 1. The moving control unit 145 controls portions of the vehicle 1 such that the vehicle 1 moves to the moving target position (parking target position) along the moving path.

The output information determination unit 146 determines information that is to be output through the display device 12, the display device 8, the audio output device 9, or the like, an output mode of the information, and the like. When new information about an obstacle, such as another vehicle, a pole, or a wall, has been acquired, the moving path update determination unit 147 determines whether to cause the moving path determination unit 144 to update the moving path to the moving target position for the vehicle 1.

The parking assist completion determination unit 148 determines completion of parking assist with desired accuracy or higher such that a time up to completion of parking assist is reduced. The storage unit 149 stores data that are used in computation in the ECU 14 or data calculated in computation in the ECU 14.

Figure 6:
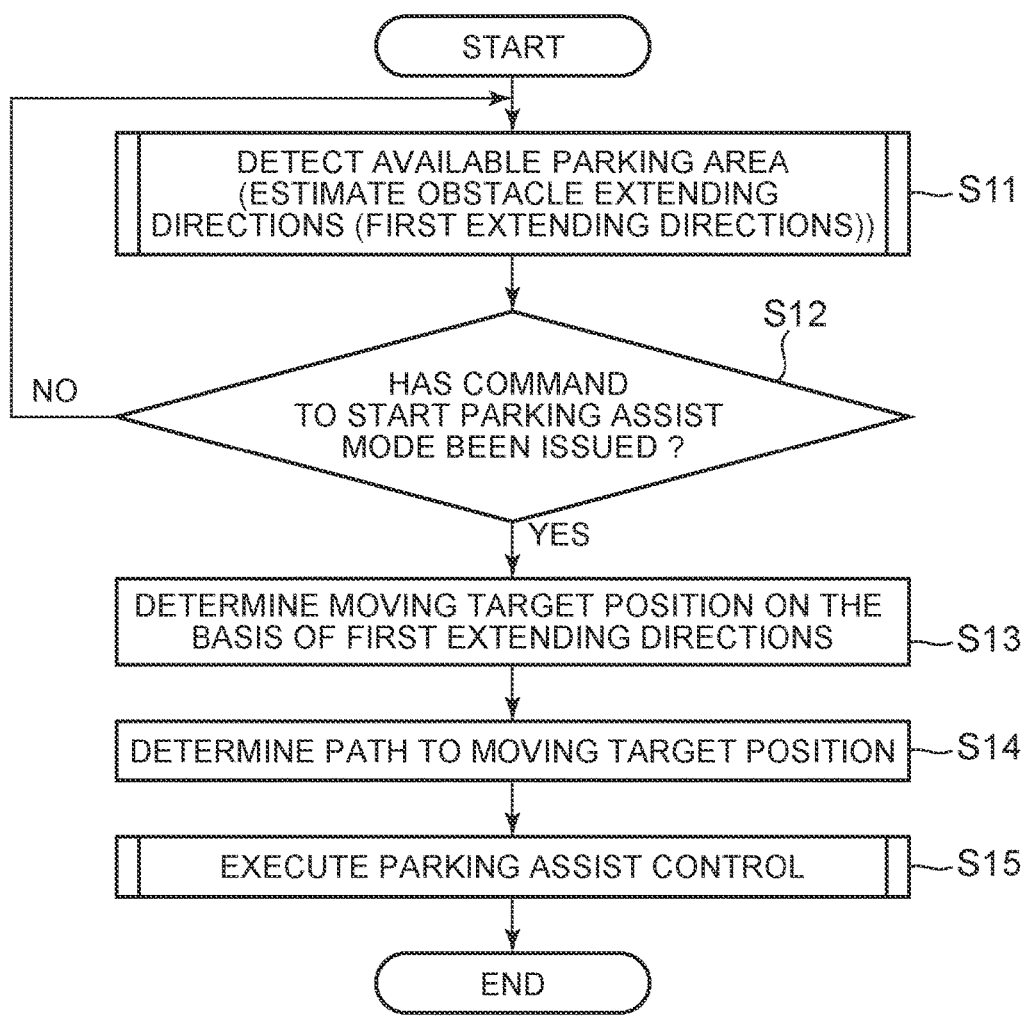
FIG. 6 is a schematic process flowchart according to the embodiment.
Figure 7:
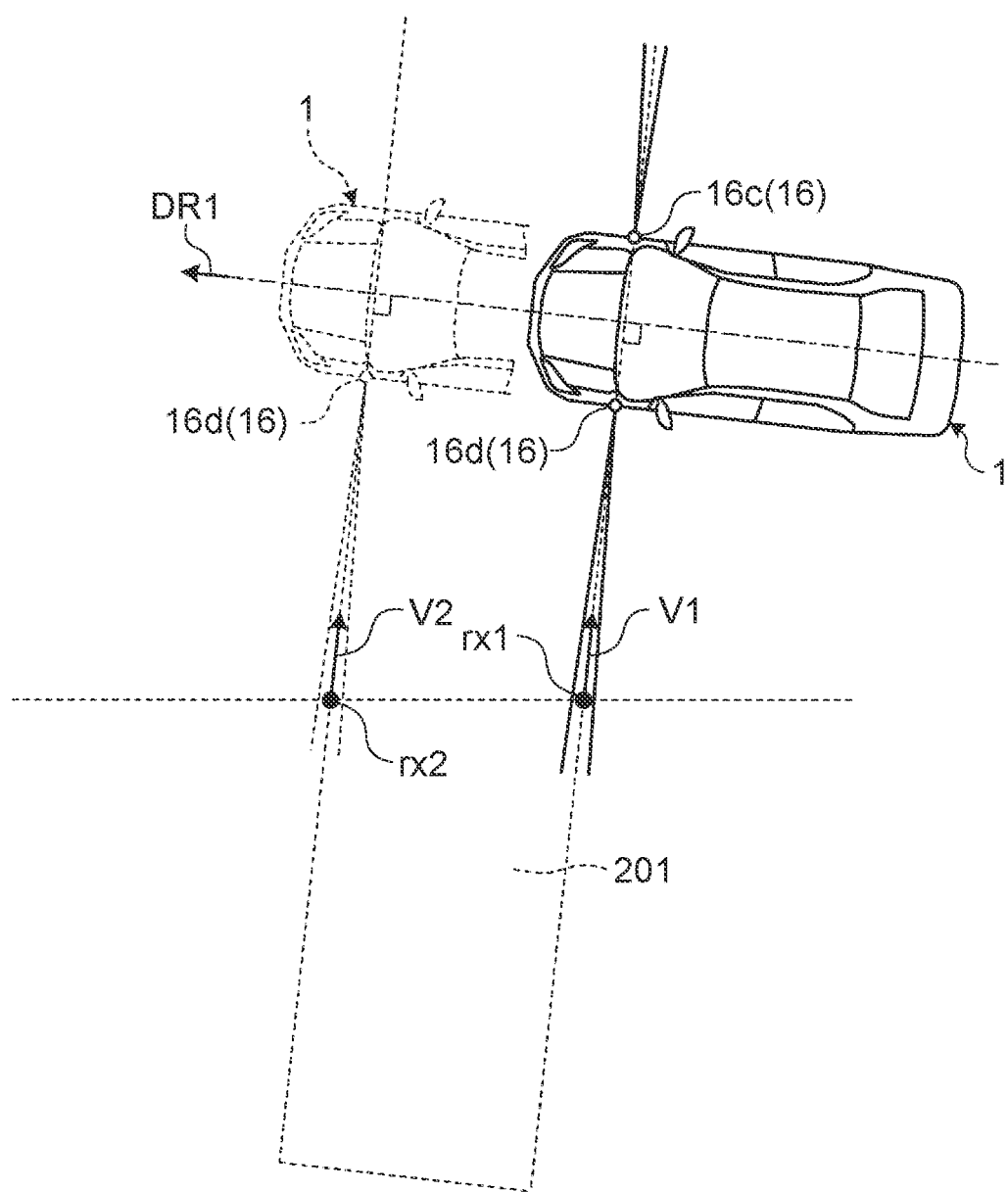
FIG. 7 is a view that illustrates detection of an available parking area.
Figure 8:
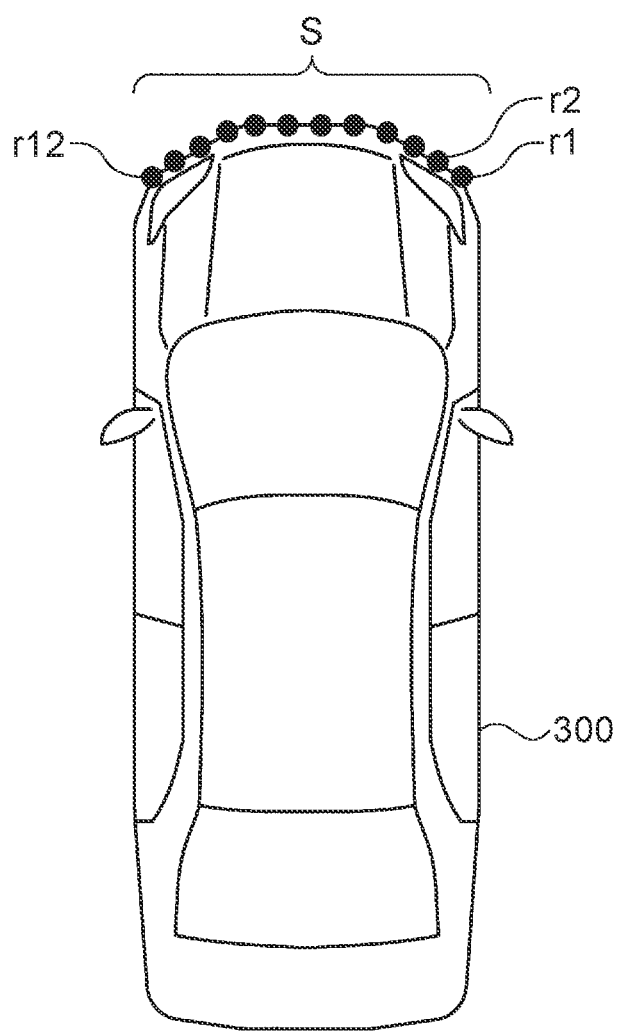
FIG. 8 is a view that illustrates a reflection portion of an obstacle.

Next, the operation of the embodiment will be described. FIG. 6 is a schematic process flowchart according to the embodiment. Initially, the ECU 14 detects an available parking area (detects an obstacle) (step S11). As shown in FIG. 6, the ECU 14 estimates extending directions (first extending directions) of obstacles respectively located on the right and left sides of the available parking area. FIG. 7 is a view that illustrates detection of an available parking area. FIG. 8 is a view that illustrates a reflection portion of an obstacle.

Specifically, the distance measuring units 16c, 16d calculate a distance to an obstacle, such as another vehicle 300 and a structure 301 (see FIG. 9) that is a wall, a pole, or the like, at each predetermined sampling timing, and outputs the distance as data corresponding to a reflection portion S (a set of reflection points r1 to r12 of a sonic wave, or the like) of the obstacle as shown in FIG. 8. The output data are, for example, stored in the RAM 14c at output intervals.

The ECU 14 functions as the detection unit 141, and detects an available parking area 201 (see FIG. 7 and FIG. 9) located on any one of the right and left sides of the vehicle 1, independently of the other side, on the basis of the output data of the distance measuring units 16c, 16d. In the case of the example shown in FIG. 7, the available parking area 201 is located on the left side of the vehicle 1. For the sake of easy understanding, a method of detecting the available parking area 201 on the left side of the vehicle 1 will be described.

Figure 9:
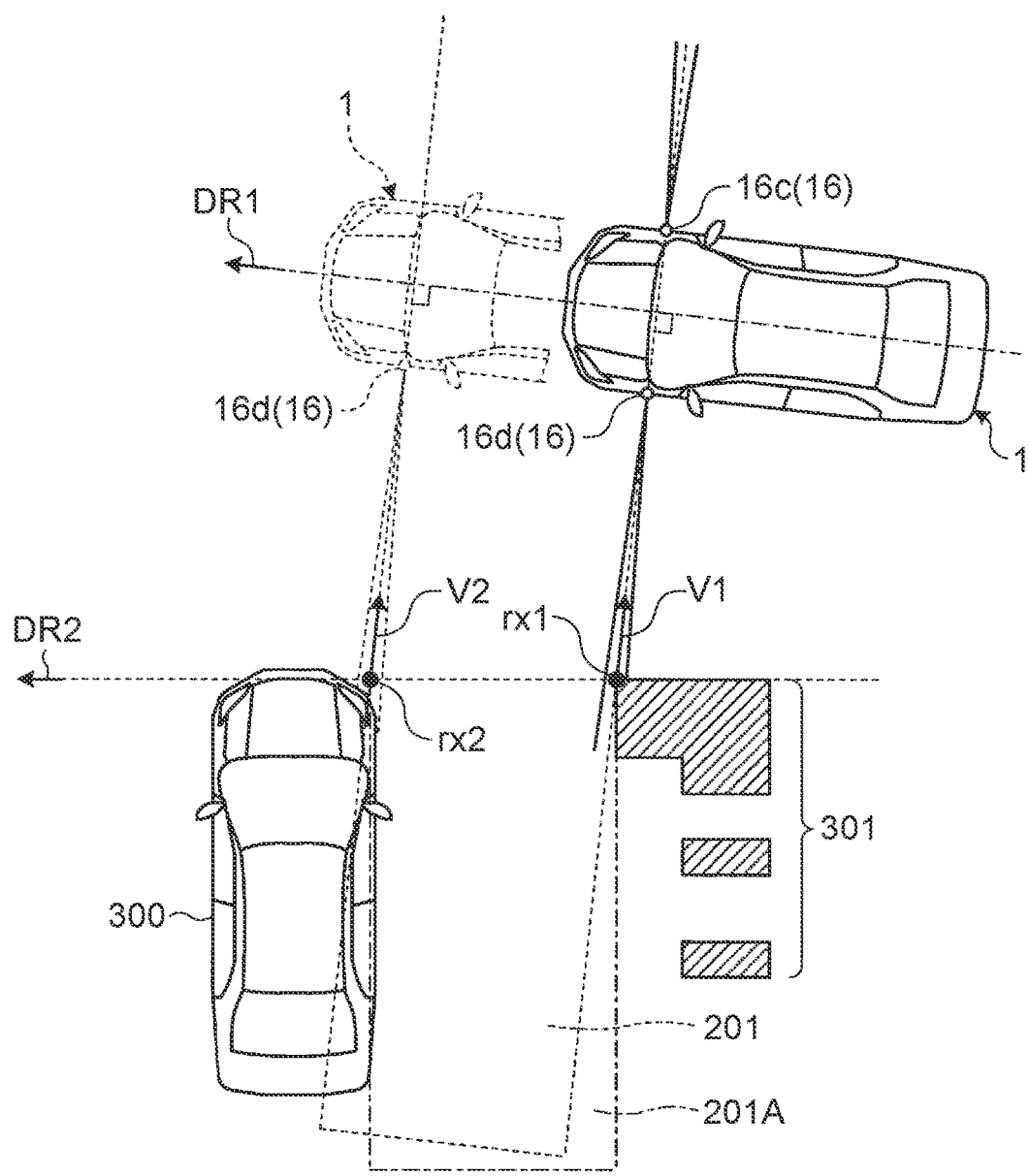
FIG. 9 is a view that illustrates an available parking area.

FIG. 9 is a view that illustrates an available parking area. The detection unit 141 determines that there is the available parking area 201 when output data corresponding to an obstacle are output for a period longer than or equal to a period corresponding to a first predetermined duration, and after that, output data corresponding to the case where there is no obstacle (including the case where a distance to an obstacle is longer than or equal to the vehicle longitudinal length (i.e., the vehicle length in the front-rear direction) required for the vehicle to park) are output for a period longer than or equal to a second predetermined duration corresponding to a minimum width required for an area in which the vehicle 1 is allowed to be parked.

More specifically, in a case where a traveling direction DR1 of the vehicle 1 is not parallel to a direction DR2 along the distal ends of obstacles and intersects with the direction DR2, when the structure 301 is detected and the output data corresponding to the obstacle are output for a period corresponding to the first predetermined duration or longer, and after that, there is no obstacle for a period longer than or equal to the second predetermined duration corresponding to the minimum width required for an available parking area where the vehicle 1 is allowed to be parked, from a reflection point rx1 at which the structure 301 is detected last time until a reflection point rx2 at which the other vehicle 300 is detected for the first time as shown in FIG. 9, the available parking area 201 is detected.

At this time, extending directions (plane angles) of the other vehicle 300 and structure 301, which are obstacles, are respectively indicated by a vector V2 and a vector V1 perpendicular to the traveling direction of the vehicle 1, and thus, the available parking area 201 is detected in a state where the available parking area 201 is inclined at a predetermined angle with respect to an actual available parking area 201A.

The detection unit 141 detects a parking space line, such as a white line, provided on a traveling surface, such as a ground surface and a road surface, on the basis of captured data output from the imaging unit 15a that captures an image behind the vehicle 1. More specifically, the detection unit 141 detects a parking space line by performing edge extraction on captured data output from the imaging units 15a to 15d while the vehicle 1 is moving backward (the vehicle 1 is being reversed), the vehicle 1 is moving forward, or the vehicle 1 is in a stopped state.

When the available parking area 201 has been detected, the ECU 14 subsequently functions as the operation receiving unit 142, and determines whether a command to start a parking assist mode has been issued via the operation unit 14g (step S12).

When it is determined in step S12 that a command to start the parking assist mode has not been issued via the operation unit 14g (No in step S12), the process proceeds again to the process of detecting a new available parking area (step S11), and effectively enters a standby state.

On the other hand, when it is determined in step S12 that a command to start the parking assist mode has been issued via the operation unit 14g (Yes in step S12), the ECU 14 functions as the target position determination unit 143, and determines a moving target position (parking target position) 200 for the vehicle 1, on the basis of the first extending directions estimated in step S11 (step S13).

Figure 10:
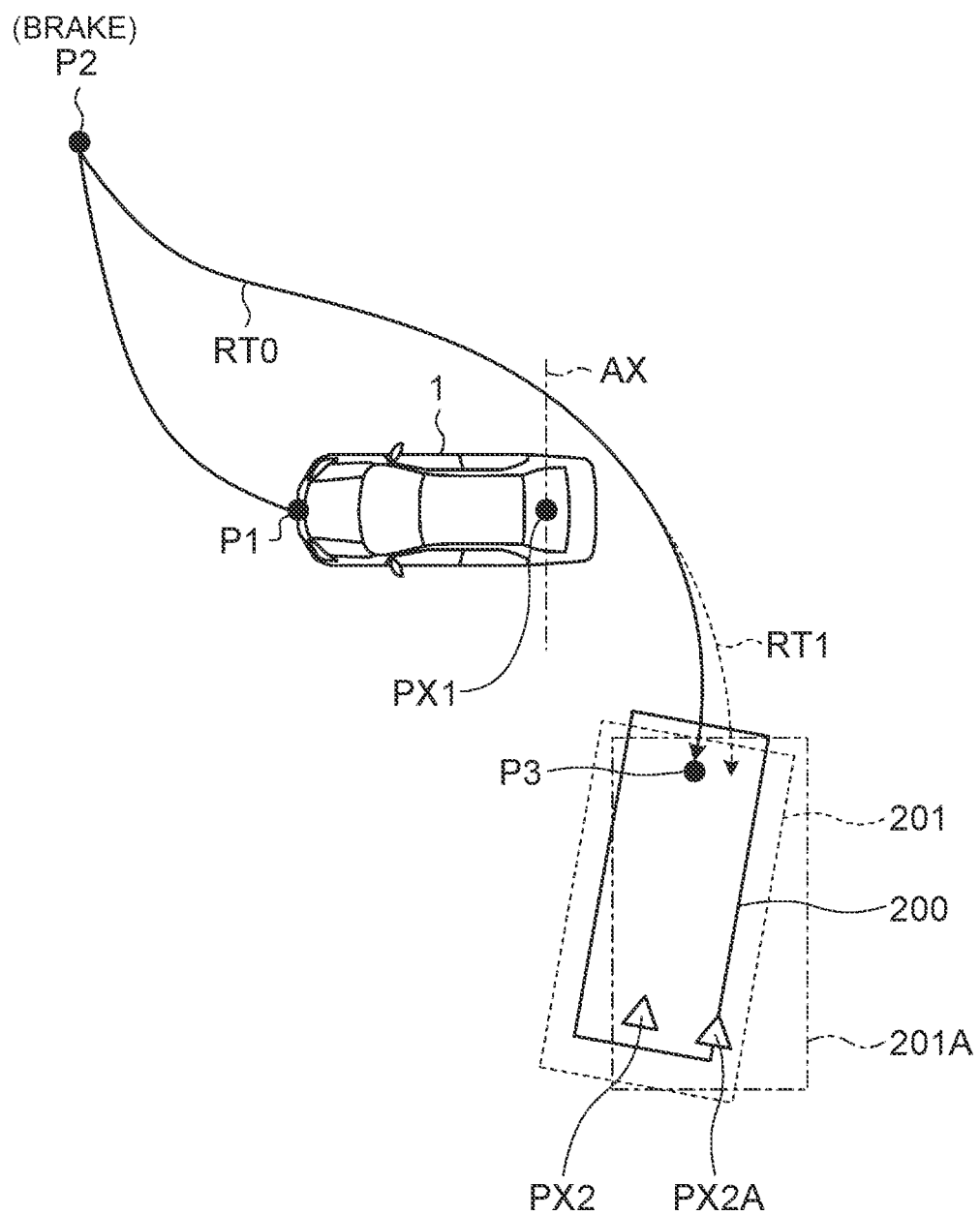
FIG. 10 is a view that illustrates an example in which a moving path is set.

FIG. 10 is a view that illustrates an example in which a moving path is set. As shown in FIG. 10, a position that is a middle point between the two rear wheels 3R and that is on a rotation axis AX of the rear wheels 3R of the vehicle 1 is set for a first parking assist completion determination position PX1, and the moving target position 200 is used in setting a moving path such that the first parking assist completion determination position PX1 moves to a predetermined position in the available parking area 201.

That is, the ECU 14 functions as the moving path determination unit 144 (a moving path calculation unit), and sets a moving path RT0 such that the first parking assist completion determination position PX1 falls within a predetermined distance from a second parking assist completion determination position PX2 set within the moving target position 200 for the vehicle 1 (step S14).

For the sake of simplification of description, the case of the moving path in which a switching position at which the steering wheel serving as the steering unit 4 is turned is one will be described with reference to FIG. 10. The switching position is also the position at which a traveling direction of the vehicle 1 is changed between a forward direction and a reverse direction.

In the moving path RT0 shown in FIG. 10, the vehicle 1 is moved forward from an initial position P1 at the start of a parking assist control process toward a switching position P2 at which the steering wheel serving as the steering unit 4 is turned, by turning the steering wheel rightward by a predetermined amount, the vehicle 1 is stopped at the switching position P2 by depressing the brake that serves as the brake operation unit 6, the gear is changed into reverse, and the vehicle 1 is moved toward the moving target position 200 while turning the steering wheel that serves as the steering unit 4 leftward.

When the moving path RT0 is determined, the ECU 14 starts parking assist control (step S15).

Figure 11:
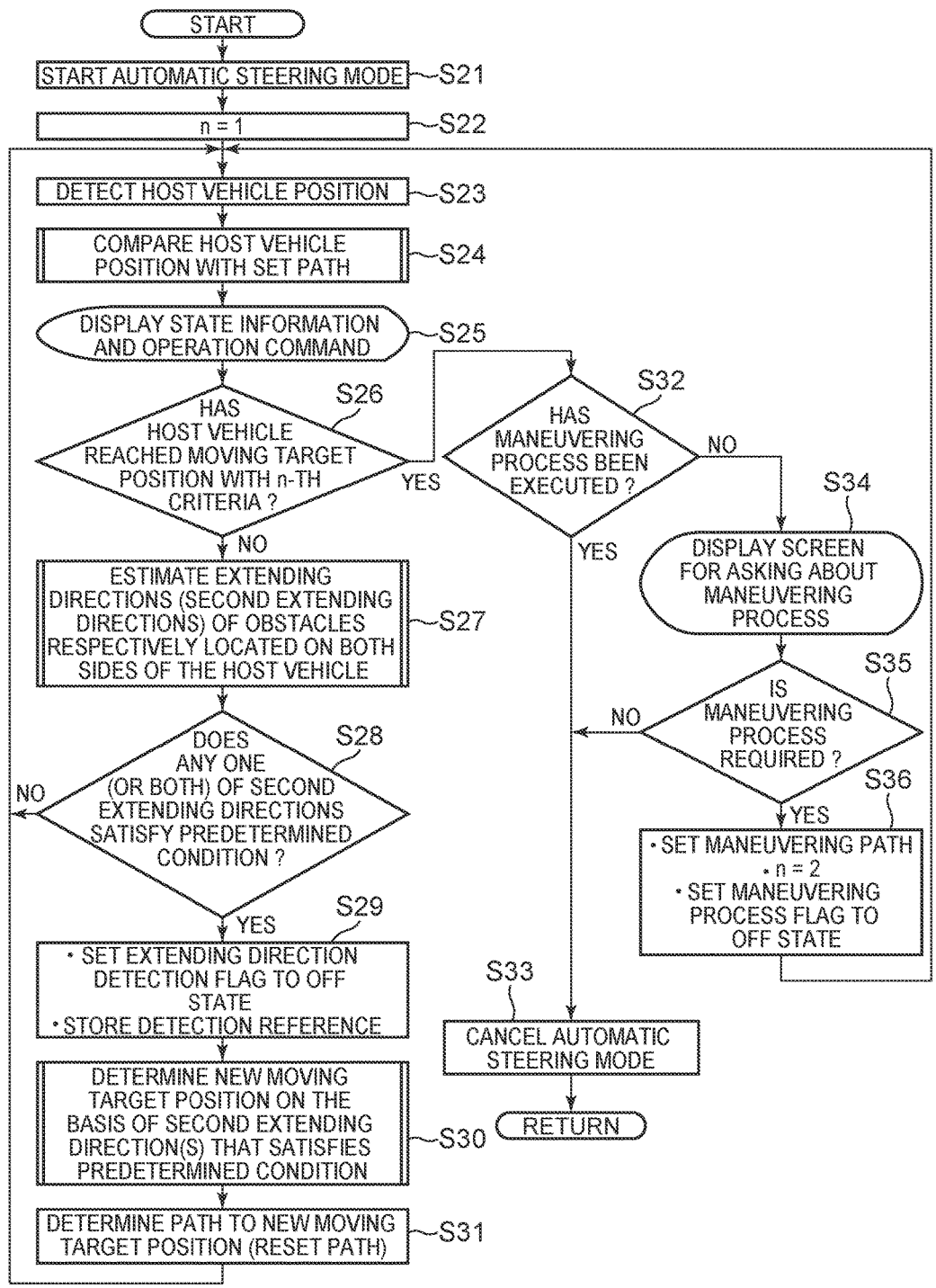
FIG. 11 is a process flowchart of a parking assist control process.

FIG. 11 is a process flowchart of a parking assist control process. Initially, the ECU 14 functions as the moving control unit 145, starts the automatic steering mode for automatic steering in order to control the portions of the vehicle 1 such that the vehicle 1 moves to the parking target position that is the moving target position along the moving path (step S21).

In this automatic steering mode, the driver does not need to operate the steering unit 4, specifically, the steering wheel. Creeping in which the driving force of the engine is transmitted without depressing operation of the accelerator pedal, which is an operation of the accelerator operation unit 5, is utilized for the forward driving force and reverse driving force of the vehicle 1 during the parking assist control process.

Therefore, the driver just operates the brake pedal that serves as the brake operation unit 6 and the shift lever that serves as the shift operation unit 7 in accordance with display on the display device 12. Subsequently, the moving control unit 145 sets "1" for a determination criterion setting parameter "n" for setting criteria on the basis of which it is determined that the vehicle 1 has reached the moving target position (step S22).

In the present embodiment, the determination criterion setting parameter includes two types, that is, n=1, 2 corresponding to first criteria and second criteria.

When the first criteria and the second criteria are compared with each other, the first criteria are totally stricter than the second criteria. More specifically, the first criteria and the second criteria are set such that, when viewed in plan, an angle made between a straight line that passes through the first parking assist completion determination position PX1 along the front-rear direction (longitudinal direction) of the vehicle 1 and a straight line along each of the extending directions of obstacles at the moving target position 200, a deviation in the right-left direction (lateral direction) of the vehicle 1 between the first parking assist completion determination position PX1 and the second parking assist completion determination position PX2, a deviation in the front-rear direction (longitudinal direction) of the vehicle 1 between the first parking assist completion determination position PX1 and the second parking assist completion determination position PX2 and the steering angle of the front wheels 3F in the first criteria are stricter than those in the second criteria.

Specifically, for example, in the first criteria, when viewed in plan, the angle made between the straight line that passes through the first parking assist completion determination position PX1 along the front-rear direction of the vehicle 1 and the straight line along each of the extending directions of the obstacles at the moving target position 200 is 0.75°, the deviation in the right-left direction (lateral direction) of the vehicle 1 between the first parking assist completion determination position PX1 and the second parking assist completion determination position PX2 is 30 mm, the deviation in the front-rear direction (longitudinal direction) of the vehicle 1 between the first parking assist completion determination position PX1 and the second parking assist completion determination position PX2 is 300 mm and the steering angle of the front wheel 3F is 20°.

In contrast, in the second criteria, when viewed in plan, the angle made between the straight line that passes through the first parking assist completion determination position PX1 along the front-rear direction of the vehicle 1 and the straight line along each of the extending directions of the obstacles at the moving target position 200 is 1.5°, the deviation in the right-left direction (lateral direction) of the vehicle 1 between the first parking assist completion determination position PX1 and the second parking assist completion determination position PX2 is 75 mm, the deviation in the front-rear direction (longitudinal direction) of the vehicle 1 between the first parking assist completion determination position PX1 and the second parking assist completion determination position PX2 is 300 mm and the steering angle of the front wheels 3F is 20°.

Subsequently, the ECU 14 functions as the detection unit 141, and detects a host vehicle position (step S23). Specifically, the ECU 14 detects the host vehicle position by calculating a distance and a direction that are a moving amount from the initial position P1 on the basis of the steering amount of the steering unit 4, detected by the steering angle sensor 19, and the vehicle speed detected by the wheel speed sensor 22.

Thus, the ECU 14 makes a comparison between the set path and the host vehicle position (step S24), serves as the output information determination unit 146 to determine information about the state of the vehicle and an operation command for the driver and display the information about the state of the vehicle and the operation command on the display device 12 (step S25).

Figure 12:
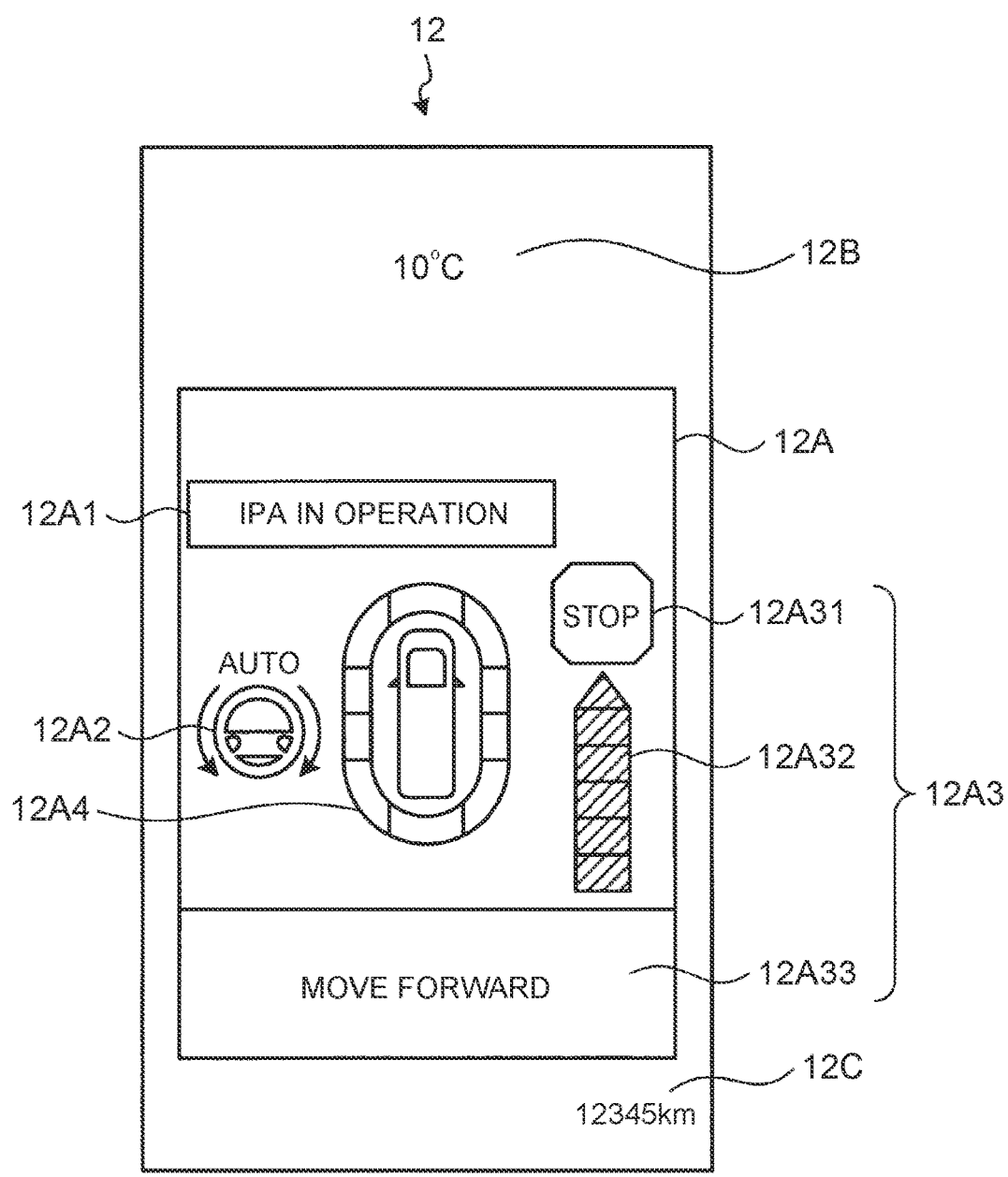
FIG. 12 is a view that illustrates an example of display at the start of the parking assist control process.

FIG. 12 is a view that illustrates an example of display at the start of the parking assist control process. The display screen of the display device 12 roughly includes a parking assist information display region 12A, a selected information display region 12B and a travel distance information display region 12C. The parking assist information display region 12A displays various pieces of information about parking assist. The selected information display region 12B displays various pieces of information selected in advance. The travel distance information display region 12C is able to display information about an odometer or a trip meter.

The parking assist information display region 12A includes a parking assist display region 12A1, an automatic steering symbol display region 12A2, an operation command display region 12A3 and an obstacle display region 12A4. The parking assist display region 12A1 displays that parking assist (intelligent parking assist (IPA)) is in operation when it is actually in operation. The automatic steering symbol display region 12A2 displays a symbol indicating that the automatic steering mode is being performed during the automatic steering mode. The operation command display region 12A3 displays an operation command to the driver. The obstacle display region 12A4 displays a direction in which an obstacle is located when the distance measuring units 16, 17 detect that the obstacle is located within a predetermined distance range around the vehicle 1.

In the above configuration, as shown in FIG. 12, a braking operation symbol 12A31, a distance indication symbol 12A32 and a command display region 12A33 are displayed in the operation command display region 12A3. The braking operation symbol 12A31 is set in a lit state at the time when a command to operate the brake that serves as the brake operation unit 6 is issued. The distance indication symbol 12A32 displays a measure of a distance to the switching position at which the steering wheel serving as the steering unit 4 is turned, or a measure of a distance to the moving target position by stepwisely changing from a fully lit state to an unlit state. The command display region 12A33 displays details of a command to the driver.

That is, in the case of FIG. 12, the display device 12 displays that parking assist is in operation, the automatic steering mode is being performed, a distance to the switching position P2 at which the steering wheel serving as the steering unit 4 is turned, or the parking target position P3 that serves as the moving target position 200 still remains nearly 100%, and the details of a command instruct the driver to stop depressing the brake pedal that serves as the brake operation unit 6 and allows the vehicle 1 to move forward by creeping.

Subsequently, the ECU 14 functions as the moving control unit 145, and determines whether the host vehicle position has reached the moving target position 200 (step S26). Specifically, the ECU 14 determines whether the first parking assist completion determination position PX1 has reached the second parking assist completion determination position PX2 and the criteria corresponding to the above-described first criteria are satisfied.

When it is determined in step S26 that the host vehicle position has not reached the moving target position 200 that serves as the target position (No in step S26), the ECU 14 functions as the moving path update determination unit 147, and estimates second extending directions that are extending directions (arrangement directions) of the obstacles respectively located on the right and left sides (i.e., on both sides) of the vehicle 1 when the vehicle 1 is positioned at the moving target position 200 (step S27). The vehicle 1 is the host vehicle.

In the case of the example shown in FIG. 9, the extending directions of the obstacles are the top-to-bottom directions of the other vehicle 300 and structure 301 in FIG. 9. Because the extending directions of the obstacles are reliably estimated, it is recognized that the actual available parking area is not the available parking area 201 shown in FIG. 9, and the actual available parking area is the available parking area 201A.

Figure 13:
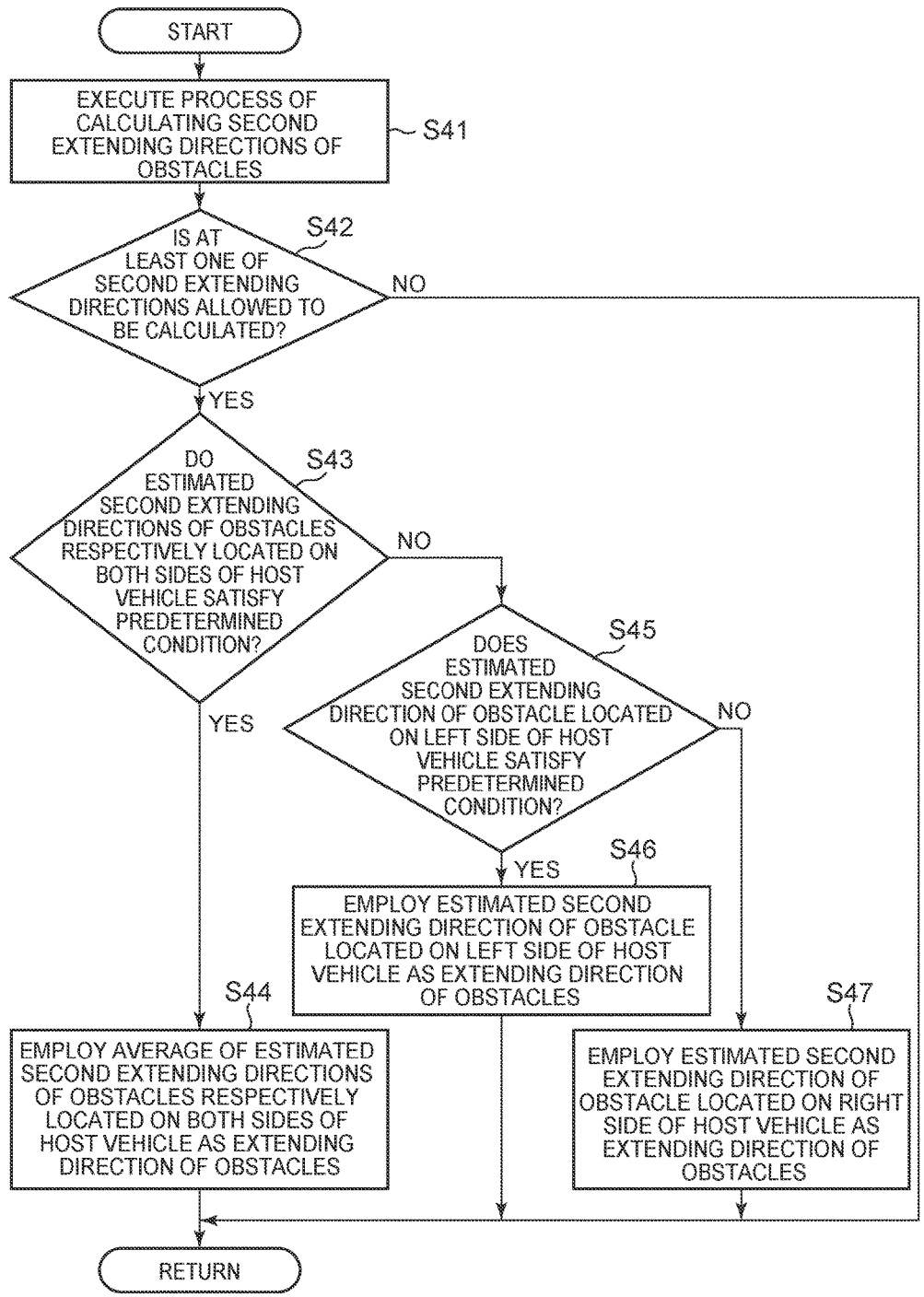
FIG. 13 is a process flowchart for estimating extending directions of obstacles.

The process of estimating the extending directions of the obstacles will be described. FIG. 13 is a process flowchart for estimating the extending directions of the obstacles. Initially, the ECU 14 functions as the moving path update determination unit 147, and calculates second extending directions that are the extending directions of the obstacles on the basis of an output of the distance measuring unit 16$a$ and an output of the distance measuring unit 16$b$.

In the present embodiment, straight-line approximation is used to calculate the second extending directions. For example, description will be made on the assumption that four measurement results, that is, four reflection points are required to be obtained by each of the distance measuring unit 16$a$ and the distance measuring unit 16$b$ per meter and a second extending direction is allowed to be calculated only when a deviation among the measurement results falls within a predetermined deviation.

Figure 14:
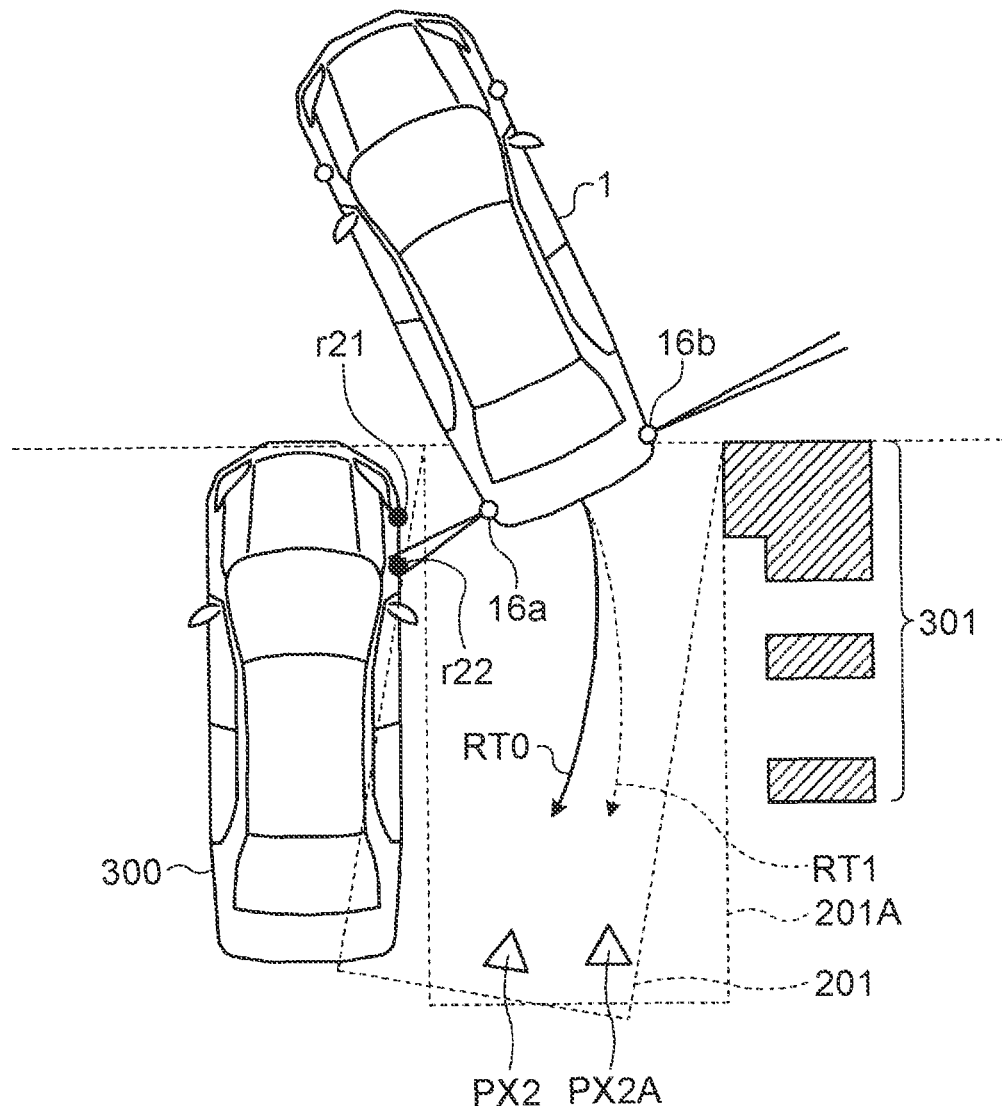
FIG. 14 is a view that illustrates a state just after the rear end of the vehicle has reached a moving target position.

FIG. 14 is a view that illustrates a state just after the rear end of the vehicle has reached the moving target position. Initially, the ECU 14 executes the process of calculating the second extending directions that are the extending directions of the obstacles respectively located on the right and left sides of the host vehicle (step S41). That is, the ECU 14 functions as a determination unit, and determines whether the second extending directions satisfy the above-described calculation criteria, that is, a predetermined condition. As shown in FIG. 14, just after the rear end of the vehicle 1 has reached the moving target position 200, only two measurement results of the distance measuring unit 16$a$, that is, a reflection point r21 and a reflection point r22 are obtained as the measurement results of the distance measuring unit 16$a$ and distance measuring unit 16$b$, and the above-described calculation criteria are not satisfied, and thus, none of the second extending directions is allowed to be calculated.

As a result, when it is determined in step S42 that none of the second extending directions is allowed to be calculated (No in step S42), the process proceeds to step S28. When it is determined in step S28 that there is no second extending direction that satisfies the predetermined condition (No in step S28), the ECU 14 that functions as the moving path update determination unit 147 determines that update of the moving path is not required. As a result, the ECU 14 proceeds to step S23 again in order to continue the process in accordance with the moving path RT0 without updating the moving path RT0 shown in FIG. 10.

Figure 15:
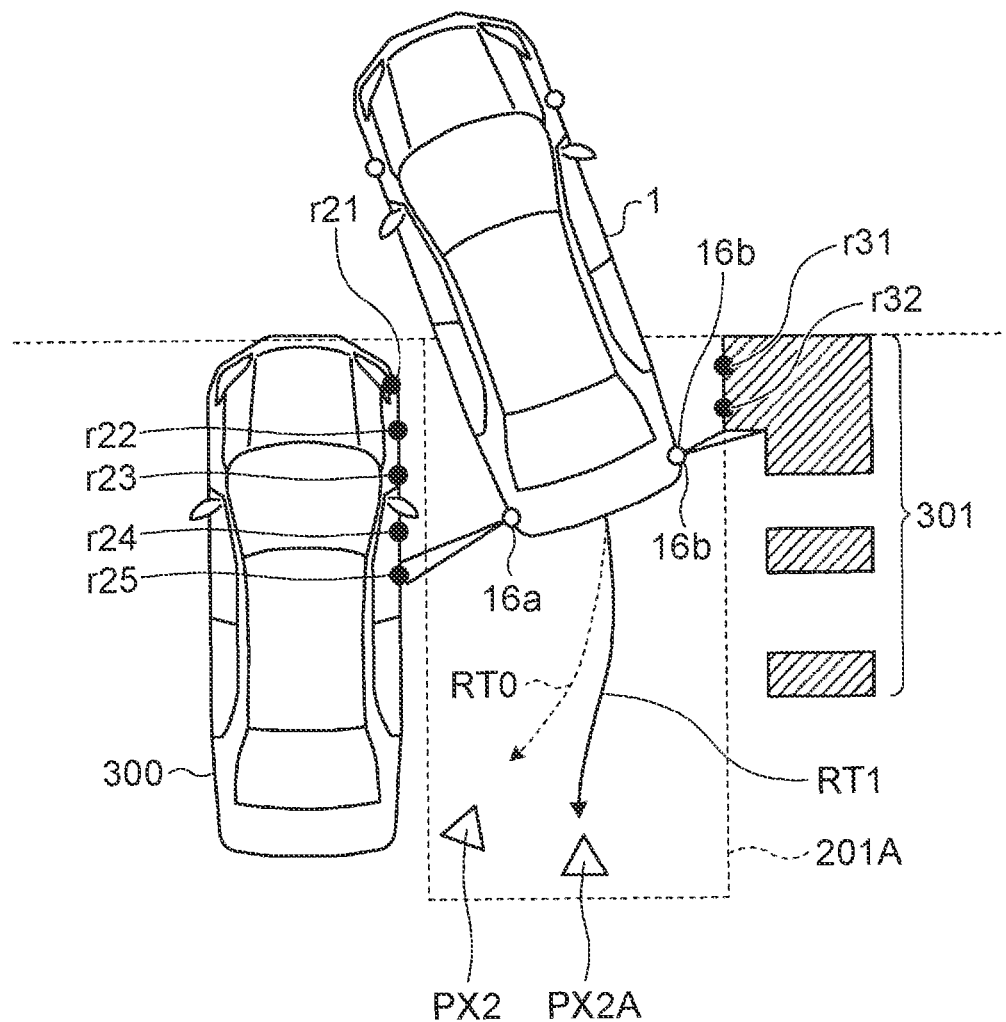
FIG. 15 is a view that illustrates a case where the rear end of the vehicle has entered the moving target position by a large amount in accordance with the moving path.

FIG. 15 is a view that illustrates a case where the rear end of the vehicle has entered the moving target position by a large amount in accordance with the moving path. The ECU 14 continues to execute the process of calculating the second extending directions of the obstacles (step S41). At this point in time, five reflection points r21 to r25 that are measurement results of the distance measuring unit 16*a* and two reflection points r31, r32 that are measurement results of the distance measuring unit 16*b* are obtained as the measurement results of the distance measuring unit 16*a* and distance measuring unit 16*b*. Thus, it is assumed that the measurement results of the distance measuring unit 16*a* satisfy the above-described calculation criteria but the measurement results of the distance measuring unit 16*b* do not satisfy the calculation criteria.

As a result, the ECU 14 is allowed to calculate one of the second extending directions (Yes in step S42), the ECU 14 determines whether the estimated second extending directions of the obstacles respectively located on the right and left sides of the host vehicle (vehicle 1) satisfy a predetermined condition (step S43).

That is, it is determined whether there are four or more measurement results, that is, four or more reflection points per meter for the second extending direction of the obstacle located on the left side of the host vehicle (vehicle 1) and a deviation among those measurement results falls within the predetermined deviation and there are four or more measurement results, that is, four or more reflection points per meter for the second extending direction of the obstacle located on the right side of the host vehicle (vehicle 1) and a deviation among those measurement results falls within the predetermined deviation. That is, it is determined whether the obtained second extending directions have predetermined accuracy (reliability).

In this case, because there are only two measurement results, that is, only two reflection points per meter for the second extending direction of the obstacle located on the right side of the host vehicle (vehicle 1), it is determined that the estimated second extending directions of the obstacles respectively located on the right and left sides of the host vehicle (vehicle 1) do not satisfy the predetermined condition (No in step S43). When it is determined that the estimated second extending directions of the obstacles respectively located on the right and left sides of the host vehicle (vehicle 1) satisfy the predetermined condition (YES in step S43), an average of the estimated second extending directions of the obstacles respectively located on the right and left sides of the host vehicle (vehicle 1) is employed as the extending direction of the obstacles (S44).

As a result, the ECU 14 determines whether the estimated second extending direction of the obstacle located on the left side of the host vehicle (vehicle 1) satisfies the predetermined condition (step S45).

Because there are four or more measurement results, that is, four or more reflection points per meter for the second extending direction of the obstacle located on the left side of the host vehicle (vehicle 1) and a deviation among those measurement results falls within the predetermined deviation (Yes in step S45), the ECU 14 employs the second extending direction of the obstacle located on the left side of the host vehicle (vehicle 1) as the extending direction of the obstacles (step S46), and proceeds to step S28.

The above description describes the case where the estimated second extending direction of the obstacle located on the left side of the host vehicle (vehicle 1) satisfies the predetermined condition. When the estimated second extending direction of the obstacle located on the left side of the host vehicle (vehicle 1) does not satisfy the predetermined condition (No in step S43), the estimated second extending direction of the obstacle located on the right side of the host vehicle (vehicle 1) satisfies the predetermined condition (No in step S45), and therefore, the ECU 14 employs the second extending direction of the obstacle located on the right side of the host vehicle (vehicle 1) as the extending direction of the obstacles (step S47), and proceeds to step S28.

Subsequently, because it is determined in step S28 that at least one of the second extending directions satisfies the predetermined condition (Yes in step S28), the ECU 14 sets an extending direction detection flag to an off state on the basis of the fact that at least one of the second extending directions has been detected, and stores a detection reference (step S29). In this case, the detection reference to be stored is information about whether any one (or both) of the second extending directions of the obstacles respectively located on the right and left sides has been detected.

As described above, when the extending direction detection flag is set to the off state, the off state of the extending direction detection flag indicates that update of the moving path is required, and thus, the ECU 14 functions as the target position determination unit 143 again as shown in FIG. 15, and determines a new second parking assist completion determination position PX2A that is the moving target position (parking target position) for the vehicle 1 (step S30).

The ECU 14 further functions as the moving path determination unit 144, and determines a new moving path RT1 to the moving target position for the vehicle 1 (step S31). The ECU 14 proceeds to step S23 again, and repeats a similar process thereafter.

The ECU 14 functions as the moving control unit 145, and determines whether the host vehicle position has reached the moving target position 200. When the first parking assist completion determination position PX1 has reached the second parking assist completion determination position PX2 and the criteria corresponding to the above-described first criteria are satisfied (Yes in step S26), the ECU 14 recognizes that the host vehicle position has reached the moving target position 200 that serves as the target position, and determines whether a maneuvering process has been executed in order to place the vehicle in a more proper position on the basis of a maneuvering process flag, that is, whether the maneuvering process flag is in an off state (step S32). The maneuvering process is a process of maneuvering (turning) the steering wheel serving as the steering unit 4 for changing a traveling direction of the vehicle 1 (host vehicle) between the forward direction and the reverse direction.

The reason why the maneuvering process is executed will be described. Even when the criteria corresponding to the first criteria are satisfied in accordance with the moving path RT1, a parking result is not always satisfactory for the user as the driver. For this reason, the maneuvering process is executed in order to obtain a more satisfactory parking result for the user.

The ECU 14 displays a screen for asking the user about whether to execute the maneuvering process on the display device 12 (step S34). The ECU 14 determines whether the user requires the maneuvering process (step S35).

Figure 16:
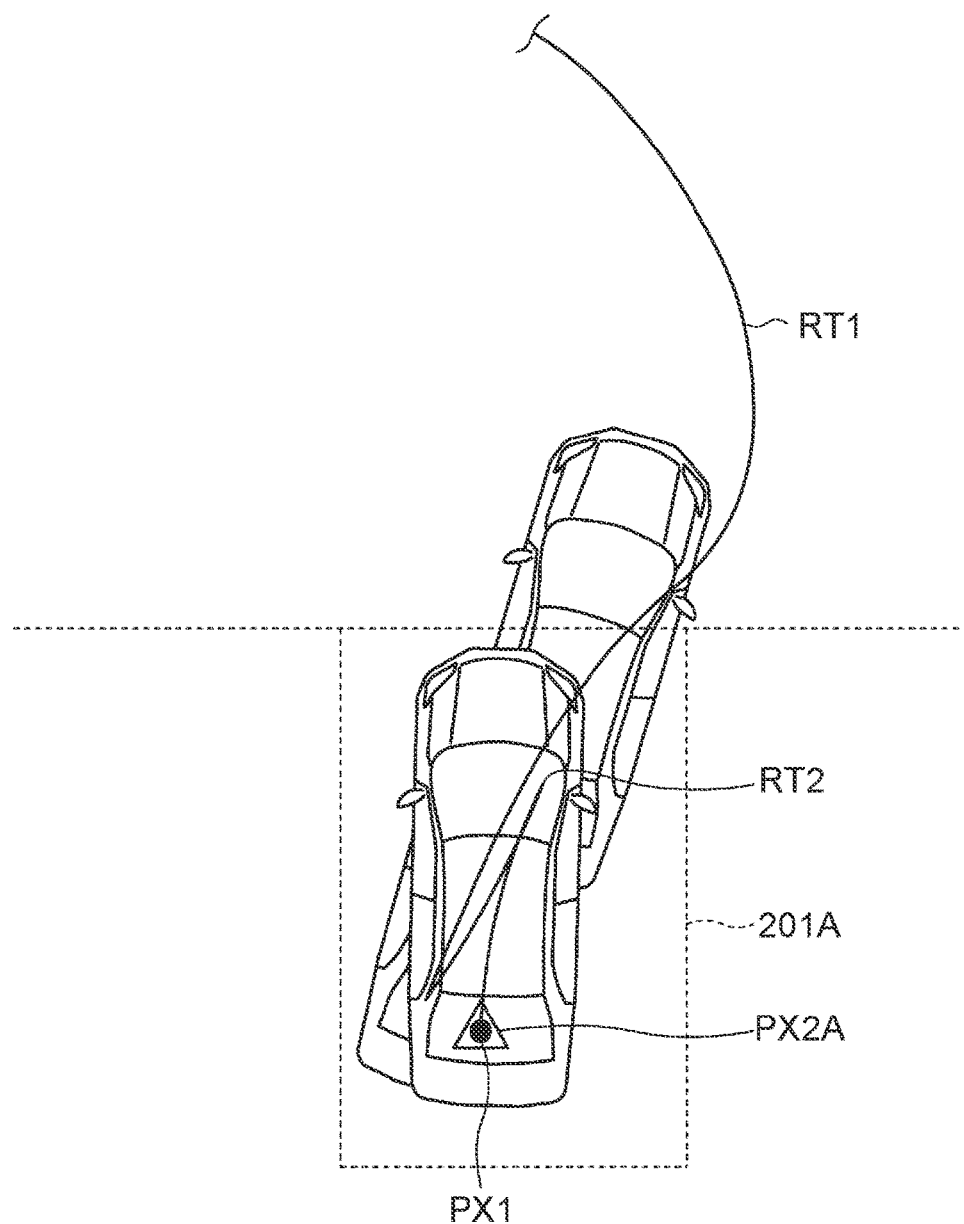
FIG. 16 is a view that illustrates a maneuvering process.

FIG. 16 is a view that illustrates the maneuvering process. When it is determined in step S35 that the user does not require the maneuvering process (No in step S35), the process proceeds to step S33.

When it is determined in step S35 that the user requires the maneuvering process (Yes in step S35), the ECU 14 functions as the moving path determination unit 144, sets a maneuvering path RT2 as shown in FIG. 16, sets "2" for the determination criterion setting parameter "n" for setting criteria on the basis of which it is determined that the vehicle 1 has reached the moving target position, and sets the maneuvering process flag to the off state (step S36).

The reason why the maneuvering process flag is set to the off state is that, even when the maneuvering process is repeatedly executed, the vehicle is not necessarily parked in a good state, and the vehicle is parked at a somewhat satisfactory parking position by executing the maneuvering process, empirically, once.

Subsequently, the ECU 14 proceeds to step S23 again, and repeats a similar process thereafter. As a result of movement along the maneuvering path RT2, when it is determined in step S26 that the vehicle 1 has reached the moving target position on the basis of the second criteria (Yes in step S26), the ECU 14 determines whether the maneuvering process has been executed on the basis of the maneuvering process flag (step S32).

In this case, because the maneuvering process flag is in the off state (Yes in step S32), the automatic steering mode is cancelled (step S33), the end of the parking assist process is displayed in the command display region 12A33 of the display device 12, and the parking assist process is ended.

As described above, according to the present embodiment, in the case where parking assist is performed, even when there are many cases where an obstacle adjacent to a parking space is not a vehicle, parking assist is performed with reference to an obstacle of which the extending direction (plane angle) has been properly detected, so it is possible to reliably perform parking assist.

When the extending direction (plane angle) of an obstacle has not been properly detected, determination criteria (the above-described first criteria) as to whether the vehicle has reached the target position are stricter than those in the case where the extending direction (plane angle) of an obstacle has been properly detected (the above-described second criteria), and thus, it is possible to further reliably guide the vehicle to a desired parking position.

Because the number of times the maneuvering process is executed is reduced, it is possible to more quickly complete parking.

The embodiment of the invention is described above; however, the embodiment is only illustrative and not intended to limit the scope of the invention. This novel embodiment may be implemented in other various forms, and various omissions, replacements and modifications may be made to the embodiment without departing from the scope of the invention. The scope of the invention encompasses the embodiment and its modifications, and the invention described in the appended claims and equivalents thereof encompass the embodiment and its modifications.

For example, in the above description, the case where the extending direction (plane angle) of an obstacle, such as a structure, located on one side is not properly estimated is described. However, even when the extending directions (plane angles) of obstacles, such as structures, located on both sides are not properly estimated, the invention is similarly applicable. In this case, the extending directions estimated respectively for both obstacles may be averaged.

Even when the extending directions (plane angles) of both obstacles are properly estimated, for example, when the obstacles located on both sides are vehicles, the extending directions estimated respectively for both obstacles may be averaged. In the above description, the number of times the maneuvering process is executed is limited to one. However, even when the number of times the maneuvering process is executed is two or more, it is possible to similarly quickly complete parking assist if the number of times is limited as needed.

What is claimed is:

1. A parking assist system that performs parking assist when a host vehicle is reversed to be parked in a perpendicular manner in a target parking space, the parking assist system comprising
an electronic control unit configured to:
when the host vehicle is reversed to be parked in the perpendicular manner in the target parking space, estimate first extending directions that are extending directions of obstacles respectively located on right and left sides of the target parking space in a state where the host vehicle moves across in front of the target parking space;
calculate a planned moving path along which the host vehicle is reversed to be parked in the perpendicular manner in the target parking space, based on the estimated first extending directions of the obstacles respectively located on the right and left sides of the target parking space;
as the host vehicle is guided into the target parking space while the host vehicle is reversed, estimate second extending directions that are extending directions of the obstacles respectively located on the right and left sides of the target parking space and subsequently updating the second extending directions until the host vehicle reaches a parking target position;
determine whether the estimated and updated second extending directions of the obstacles respectively located on the right and left sides of the target parking space satisfy a predetermined condition; and
when the updated second extending directions satisfy the predetermined condition based on a determination result, update the planned moving path by using the updated second extending directions instead of the first extending directions or the second extending directions before being updated;
determine whether the host vehicle has reached the parking target position based on a predetermined criterion; and
when at least one of the updated second extending directions satisfies the predetermined condition, determine whether the host vehicle has reached the parking target position by using a reach determination condition, which is at least one of the predetermined criterion, having a measurement deviation greater than a reach determination condition used in a case where neither of the updated second extending directions satisfies the predetermined condition.

2. The parking assist system according to claim 1, wherein the electronic control unit is configured to, when the electronic control unit determines that the host vehicle has reached the parking target position, cause the host vehicle to move to the parking target position by executing a maneuvering process for changing a traveling direction of the host vehicle between a forward direction and a reverse direction, a predetermined number of times.

3. The parking assist system according to claim 1, wherein the electronic control unit is configured to, when only one of the estimated and updated second extending directions of the obstacles respectively located on the right and left sides of the target parking space satisfies the predetermined condition, update the planned moving path by using only the one second extending direction that satisfies the predetermined condition.

4. The parking assist system according to claim 1, wherein the electronic control unit is configured to, when both of the two estimated and updated second extending directions of the obstacles respectively located on the right and left sides of the target parking space satisfy the predetermined condition, update the planned moving path by using an average of the two second extending directions.

5. A method that is performed in a parking assist system that performs parking assist when a host vehicle is reversed to be parked in a perpendicular manner in a target parking space, the method comprising:
- a first step of, when the host vehicle is reversed to be parked in the perpendicular manner in the target parking space, estimating first extending directions that are extending directions of obstacles respectively located on right and left sides of the target parking space in a state where the host vehicle moves across in front of the target parking space;
- a second step of calculating a planned moving path along which the host vehicle is reversed to be parked in the perpendicular manner in the target parking space, based on the estimated first extending directions of the obstacles respectively located on the right and left sides of the target parking space;
- a third step of, as the host vehicle is guided into the target parking space while the host vehicle is reversed, estimating second extending directions that are extending directions of the obstacles respectively located on the right and left sides of the target parking space and subsequently updating the second extending directions until the host vehicle reaches a parking target position;
- a fourth step of determining whether the estimated and updated second extending directions of the obstacles respectively located on the right and left sides of the target parking space satisfy a predetermined condition;
- a fifth step of, when the updated second extending directions satisfy the predetermined condition based on a determination result obtained in the fourth step, updating the planned moving path by using the updated second extending directions instead of the first extending directions or the second extending directions before being updated;
- a sixth step of determining whether the host vehicle has reached the parking target position based on a predetermined criterion; and
- a seventh step of, when at least one of the updated second extending directions satisfies the predetermined condition, determining whether the host vehicle has reached the parking target position by using a reach determination condition, which is at least one of the predetermined criterion, having a measurement deviation greater than a reach determination condition used in a case where neither of the updated second extending directions satisfies the predetermined condition.

6. A non-transitory computer readable medium storing a program for causing a computer to control a parking assist system that performs parking assist when a host vehicle is reversed to be parked in a perpendicular manner in a target parking space, the program causing the computer to function as:
- a first estimation unit that, when the host vehicle is reversed to be parked in the perpendicular manner in the target parking space, estimates first extending directions that are extending directions of obstacles respectively located on right and left sides of the target parking space in a state where the host vehicle moves across in front of the target parking space;
- a moving path calculation unit that calculates a planned moving path along which the host vehicle is reversed to be parked in the perpendicular manner in the target parking space, based on the estimated first extending directions of the obstacles respectively located on the right and left sides of the target parking space;
- a second estimation unit that, as the host vehicle is guided into the target parking space while the host vehicle is reversed, estimates second extending directions that are extending directions of the obstacles respectively located on the right and left sides of the target parking space and subsequently updating the second extending directions until the host vehicle reaches a parking target position;
- a determination unit that determines whether the estimated and updated second extending directions of the obstacles respectively located on the right and left sides of the target parking space satisfy a predetermined condition; and
- a moving path updating unit that, when the updated second extending directions satisfy the predetermined condition based on a determination result, updates the planned moving path by using the updated second extending directions instead of the first extending directions or the second extending directions before being updated;
- a second determination unit that determines whether the host vehicle has reached the parking target position based on a predetermined criterion; and
- a third determination unit that, when at least one of the updated second extending directions satisfies the predetermined condition, determines whether the host vehicle has reached the parking target position by using a reach determination condition, which is at least one of the predetermined criterion, having a measurement deviation greater than a reach determination condition used in a case where neither of the updated second extending directions satisfies the predetermined condition.

* * * * *